US011170165B1

United States Patent
Smith Devine

(10) Patent No.: US 11,170,165 B1
(45) Date of Patent: *Nov. 9, 2021

(54) DATA PROCESSING IN SPREADSHEET WORKSHEETS

(71) Applicant: Sigma Sciences Limited, Scotland (GB)

(72) Inventor: Robert Laurie Smith Devine, Stirlingshire (GB)

(73) Assignee: Sigma Sciences Limited, Stirlingshire (GB)

( * ) Notice: Subject to any disclaimer, the term of this patent is extended or adjusted under 35 U.S.C. 154(b) by 13 days.

This patent is subject to a terminal disclaimer.

(21) Appl. No.: 16/716,187

(22) Filed: Dec. 16, 2019

Related U.S. Application Data

(63) Continuation-in-part of application No. 15/069,932, filed on Mar. 14, 2016, now Pat. No. 10,509,858.

(60) Provisional application No. 62/133,427, filed on Mar. 15, 2015, provisional application No. 62/133,431, filed on Mar. 15, 2015.

(51) Int. Cl.
  *G06F 40/18* (2020.01)
  *G06F 40/103* (2020.01)
  *G06F 21/62* (2013.01)

(52) U.S. Cl.
  CPC .......... *G06F 40/18* (2020.01); *G06F 21/6227* (2013.01); *G06F 40/103* (2020.01)

(58) Field of Classification Search
  None
  See application file for complete search history.

(56) References Cited

U.S. PATENT DOCUMENTS

| | | | |
|---|---|---|---|
| 7,143,338 B2 * | 11/2006 | Bauchot | G06F 40/18 715/212 |
| 7,266,763 B2 | 9/2007 | Peyton-Jones et al. | |
| 7,624,372 B1 | 11/2009 | Stewart | |
| 8,656,269 B1 | 2/2014 | Yuasa et al. | |
| 8,656,271 B2 | 2/2014 | Vaysierre et al. | |
| 9,037,961 B1 | 5/2015 | Mansell | |
| 9,311,289 B1 | 4/2016 | Kaptur et al. | |
| 2002/0007372 A1 | 1/2002 | Bauchot et al. | |
| 2003/0110191 A1 | 6/2003 | Handsaker et al. | |
| 2005/0081141 A1 | 4/2005 | Jonsson | |
| 2005/0223051 A1 | 10/2005 | Arakaki | |
| 2006/0069696 A1 | 3/2006 | Becker et al. | |
| 2006/0090156 A1 * | 4/2006 | Tanenbaum | G06F 8/30 717/140 |
| 2006/0129929 A1 | 6/2006 | Weber et al. | |

(Continued)

OTHER PUBLICATIONS

ExtendOffice, How to add/insert prefix or suffix to range of cells in Excel, Published: Jul. 24, 2013, pp. 1-4.

*Primary Examiner* — Howard Cortes
(74) *Attorney, Agent, or Firm* — Lodestone Legal Group; Jeromye V. Sartain

(57) ABSTRACT

A system and methods for defining spreadsheet worksheet functions capable of returning more than one output value to a worksheet with the layout of the returned values being customizable through the use of named ranges on the worksheet. The mapping of an output value to a destination cell (or range) is achieved by using a naming convention, wherein the name of the output parameter as defined in the worksheet function or in an interactive coding environment is automatically mapped to a worksheet range having the same name.

24 Claims, 13 Drawing Sheets

(56) References Cited

U.S. PATENT DOCUMENTS

| | | |
|---|---|---|
| 2008/0168341 A1 | 7/2008 | Payette |
| 2009/0113388 A1 | 4/2009 | Lindhorst |
| 2009/0319553 A1 | 12/2009 | Le Brazidec et al. |
| 2012/0137203 A1 | 5/2012 | Schodl |
| 2013/0013995 A1 | 1/2013 | Khen et al. |
| 2014/0164895 A1 | 6/2014 | Matheson et al. |
| 2015/0286552 A1 | 10/2015 | Michelsen |
| 2015/0378977 A1 | 12/2015 | Moharir et al. |

* cited by examiner

```
IRegressionOutput = interface
  property DegreesOfFreedom: integer;
  property FValue: double;
  property Intercept: double;
  property RSquared: double;
  property Slope: double;
  property RegressionSS: double;
  property ResidualSS: double;
end;
```

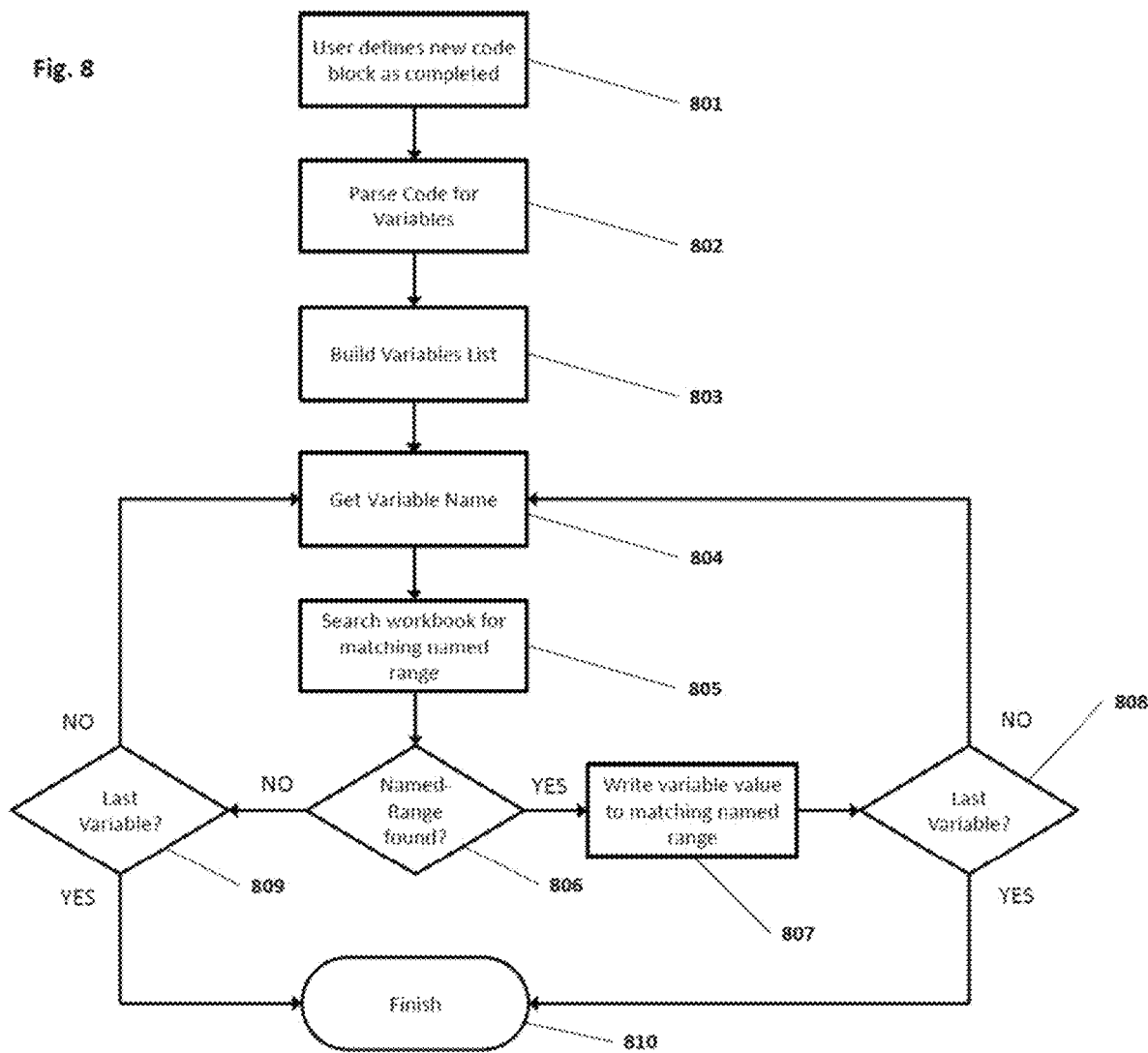

Fig. 10(a)
```
type
  Customer* = ref object
    firstname: string
    surname: string
    gender: string
    dateofbirth: datetime
    country: string
```
1001
Fig. 10(b)
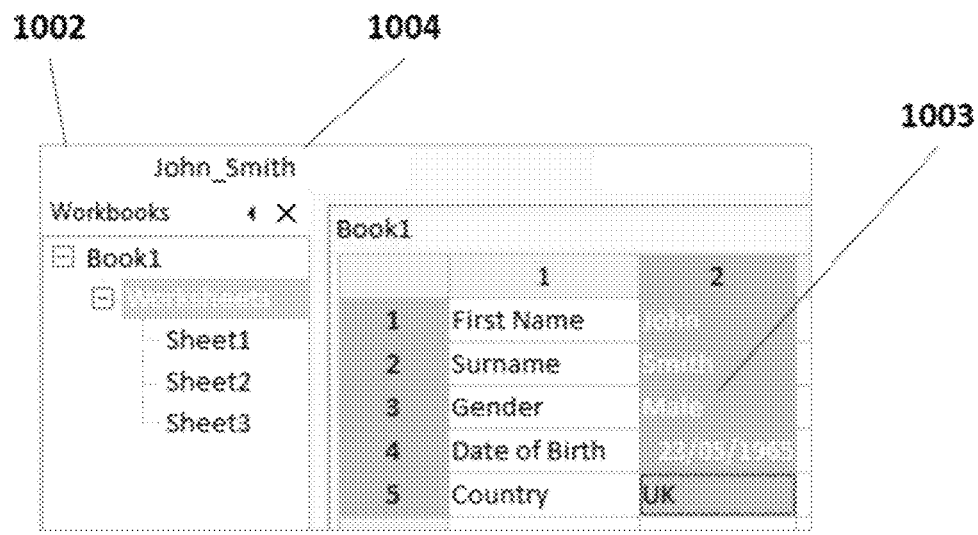
Fig. 10(c)
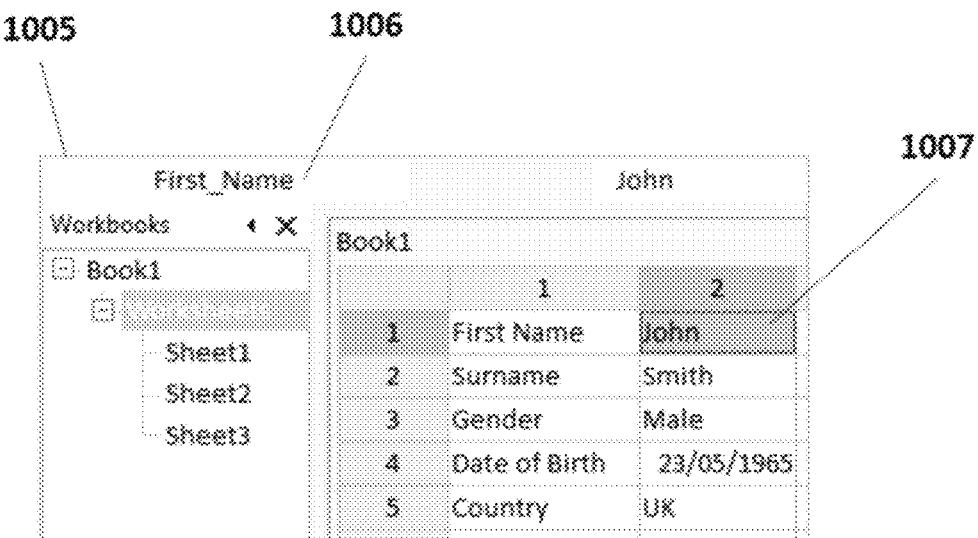

```
y_in = 7;
z_in = 3;
x_out = y_in + z_in;
Assert(x_out == 10);
```
1201

```
y_in = 7;
z_in = 3;
x_out = y_in + z_in;
```
1202

1203, 1204, 1205

DATA PROCESSING IN SPREADSHEET WORKSHEETS

RELATED APPLICATIONS

This is a continuation-in-part application and so claims the benefit pursuant to 35 U.S.C. § 120 of a prior filed and co-pending U.S. Non-Provisional patent application Ser. No. 15/069,932 filed Mar. 14, 2016, and entitled "Data Processing in Spreadsheet Worksheets," which itself claims priority pursuant to 35 U.S.C. § 119(e) to and is entitled to the filing dates of U.S. Provisional Patent Application Ser. No. 62/133,427, filed Mar. 15, 2015, and U.S. Provisional Patent Application Ser. No. 62/133,431, filed Mar. 15, 2015. The contents of the aforementioned applications are incorporated herein by reference.

FIELD OF THE DISCLOSURE

The present disclosure relates to data processing, and in particular to the processing of data in spreadsheet worksheets.

BACKGROUND OF THE DISCLOSURE

Spreadsheets are ubiquitous in modern business and almost all businesses rely on them for at least some of their business processes. In typical usage, what is commonly referred to as a "spreadsheet" is in fact a file (or a "workbook") that is populated by one or more spreadsheet worksheets. The spreadsheet model and associated data will normally be distributed across multiple worksheets, and a workbook will often contain more than one model. Spreadsheet workbooks are commonly stored on disk as a file, either on the user's desktop computer or mobile device, or on a network shared folder.

A key element of any spreadsheet system is the concept of a worksheet function. All spreadsheet systems incorporate a set of standard worksheet functions (e.g. SUM, AVERAGE etc) and some systems also include the ability for a user to define their own custom functions.

The most commonly used spreadsheet worksheet functions return a single value to the cell within which the function is embedded. For example, "=SUM(A1:A9)" will add all the values in cells A1 to A9 and insert their sum in the cell where the user has typed the formula. The exception to this is functions that can operate as so-called Array Functions, which is the only type where multiple values can be returned.

In the case of an array function the user selects a range of cells on the worksheet and the function populates the cells within the selected range with the different calculated values. The main disadvantage of array formulas is that the values are returned as a single block of contiguous numbers, with no indication as to what each value represents. This in turn means that the user must refer to the documentation in order to understand what each value means.

In addition, the single block of contiguous numbers makes it impossible to create flexible user-interfaces—e.g. there is no way to insert cells into the array for descriptive labels.

In addition, when typing worksheet formulas into worksheet cells, existing approaches require the user to explicitly specify the cell (or range) location (or name) for each non-optional input parameter. It is not currently possible for such parameter lists to be automatically populated.

SUMMARY OF THE DISCLOSURE

These teachings pertain to systems and methods for creating automatic parameter mappings in spreadsheet worksheet functions. In particular, such mappings allow users to create multi-output worksheet functions and to automatically populate worksheet function input parameters.

According to a first aspect of the disclosure there is provided a method of data processing in a spreadsheet workbook, comprising: retrieving values to be used as input values; processing the input values to derive one or more output values; and outputting the resulting output values to one or more named output worksheet ranges; wherein each of the output worksheet ranges are mapped to a corresponding output parameter name defined within a worksheet function or interactive coding environment that performs said processing.

Optionally, retrieving values comprises retrieving values from one or more input worksheet ranges.

The values may be retrieved from other sources that are not part of a spreadsheet, for example, a database or web-based source. It is also to be appreciated that references in the following to operating on a range of cells in a worksheet or workbook can also generally be applied to operating on other data sources.

Optionally, the name of each named worksheet range is mapped to a corresponding output parameter with the same name.

Optionally, the name of either the named worksheet range or the output parameter contains a pre-defined suffix or prefix.

Optionally, the input worksheet ranges for the processing are named, and each of the input worksheet ranges are mapped to a corresponding input parameter name defined within a function that performs said processing.

Optionally, the name of each named worksheet range is mapped to a corresponding input parameter with the same name.

Optionally, the name of either the named worksheet range or the input parameter comprises a pre-defined suffix or prefix.

Optionally, the required input values are automatically populated based on a parameter list of a function that carries out the processing.

Optionally, any number of input parameters are optional on the list even if they are required within the function.

Optionally, a user interface is provided for a user to define input worksheet ranges and/or output worksheet ranges.

Optionally, a user can customize an output format of a worksheet by creating or deleting different named ranges.

Optionally, different outputs can be presented to different users.

Optionally, a user can specify different layouts for the different output values.

Optionally, the output ranges are located next to cells with descriptive labels.

Optionally, mapping within processing the data in the input values to derive one or more output values is implemented with a software object.

Optionally, after the processing has been completed, an output object is created that holds output names and their corresponding values within a set of output object properties.

Optionally, after the processing has been completed, a list of output objects is created, each of which contains a single output name and its corresponding value.

Optionally, an output object exposes object property names and types to be determined by a system at runtime.

Optionally, an output object list exposes output names and types to be determined by a system at runtime.

Optionally, the processing is implemented with a script which is in turn managed by a scripting engine which is in turn linked to an application spreadsheet engine.

Optionally, the processing is performed by one or more worksheet functions which are incorporated into a compiled software library which is in turn linked to an application spreadsheet engine.

Optionally, output definitions are stored separately from code which implements said processing.

Optionally, output values from multiple functions are communicated to the workbook via a single global dispatcher function.

Optionally, output values are communicated to the workbook by each function individually.

Optionally, an output object or list of outputs is returned to a spreadsheet engine, which in turn manages the copying of the output values to the matching named ranges.

Optionally, output values generated by the worksheet function are derived from calculated values.

Optionally, values involved in the processing are retrieved from a web service.

Optionally, values involved in the processing are retrieved from a data source such as a database or file.

Optionally, the worksheet named ranges are pre-defined.

Optionally, the worksheet named ranges are defined at runtime, and wherein each worksheet range name is defined based on a matching variable name defined in computer software code.

Optionally, the worksheet range name defined at runtime is identical to the respective variable name defined in the computer software code.

Optionally, the worksheet range name defined at runtime comprises a pre-defined suffix or prefix.

Optionally, the worksheet range name defined at runtime comprises a suffix or prefix which is generated automatically at runtime.

Optionally, a user can customize an output format of a spreadsheet worksheet by creating or deleting different output worksheet named ranges.

Optionally, different outputs can be presented to different users according to user permissions or roles.

Optionally, a user can specify different layouts for different output values.

Optionally, output values are located next to cells with descriptive labels.

Optionally, the computer software code comprises one or more variables, each variable defining a property name and a property type, and wherein the variable property names and types are determined by the computing device at runtime using runtime type information.

Optionally, a software code interpreter able to evaluate individual lines of the computer software code in isolation is provided.

Optionally, a software code compiler able to evaluate individual lines of the computer software code in isolation is provided.

Optionally, an execution engine is provided, the execution engine providing a user interface enabling a user to enter and evaluate one or more lines of the computer software code.

Optionally, the creation of a named range within the spreadsheet workbook generates code defining a corresponding matching variable.

Optionally, the user interface further enables a user to load a file comprising the computer software code.

Optionally, the spreadsheet engine provides a spreadsheet worksheet function for retrieving values to be used as input values and processing the input values to derive one or more output values.

Optionally, type information expected for a worksheet named range is stored internally within the spreadsheet workbook.

Optionally, type information expected for a worksheet named range is defined through formatting information for the worksheet named range.

Optionally, input and output variables within the computer software code are additionally matched to worksheet named ranges according to a scope of the respective worksheet named range.

Optionally, the input variables within the computer software code are additionally matched to worksheet named ranges defined as having worksheet-scope, and further wherein the output variables within the computer software code are additionally matched to worksheet named ranges defined as having workbook-scope.

Optionally, the input variables within the computer software code are additionally matched to worksheet named ranges defined as having workbook-scope, and further wherein the output variables within the computer software code are additionally matched to worksheet named ranges defined as having worksheet-scope.

According to a second aspect of the disclosure there is provided a method of data processing in a spreadsheet workbook, comprising: retrieving values from one or more input worksheet named ranges to be used as input values; processing the data in said input worksheet ranges to derive one or more output values; and outputting the resulting output values to one or more output worksheet ranges; wherein each of the input worksheet ranges are mapped to a corresponding input parameter name defined within a worksheet function or interactive coding environment that performs said processing.

Optionally, the name of each named worksheet range is mapped to a corresponding input parameter with the same name.

Optionally, the name of either the named worksheet range or the input parameter comprises a pre-defined suffix or prefix.

The second aspect may also comprise the features of the first aspect.

According to a third aspect of the disclosure there is provided a data processing system comprising a spreadsheet workbook and a processor arranged to retrieve values to be used as input values, process the input values to derive one or more output values, and output the resulting output values to one or more output worksheet ranges; wherein the input and/or output values comprise named ranges, and each named range is mapped to a corresponding parameter name defined within a worksheet function or interactive coding environment that performs said processing.

According to a fourth aspect of the disclosure there is provided a computer program product comprising instructions, that, when executed on a computing device, enable it to function as a data processing system arranged to retrieve values to be used as input values, process the data in said input values to derive one or more output values, and output the resulting output values to one or more output worksheet ranges; wherein the input and/or output values comprise named ranges, and each named range is mapped to a corresponding parameter name defined within a worksheet function or interactive coding environment that performs said processing.

The computer program product may be stored on or transmitted as one or more instructions or code on a computer-readable medium. Computer-readable media includes both computer storage media and communication media including any medium that facilitates transfer of a computer program from one place to another. A storage media may be any available media that can be accessed by a computer. By way of example such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fibre optic cable, twisted pair, digital subscriber line (DSL), or wireless technologies such as infra-red, radio, and microwave, then the coaxial cable, fibre optic cable, twisted pair, DSL, or wireless technologies such as infra-red, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

These teachings describe a system and methods for implementing spreadsheet worksheet functions that are able to return multiple calculated values with an arbitrary layout on the worksheet. In this approach the different return values are each mapped to a cell or range on the worksheet by using the output parameter names, and linking them to corresponding named cells/ranges. Note that throughout these teachings we will often refer to named cells and named ranges interchangeably.

An important aspect of the current disclosure is that it can be implemented using standard spreadsheet technology: There is no requirement to invoke concepts such as cell objects. Any objects that might be involved in the described disclosure are software objects that reside entirely within the function library: The spreadsheet engine need not have any knowledge of their existence. This is in contrast to other proposed approaches to extending the usefulness of worksheet functions.

BRIEF DESCRIPTION OF THE DRAWINGS

The present disclosure will be described, by way of example only, with reference to the accompanying drawings, which show the following:

FIG. 2: An example of a software code interface for the results of a single-factor linear regression, defined using Object Pascal.

FIG. 8: Exemplary workflow for an exemplary interactive coding environment architecture linked to a spreadsheet workbook.

FIG. 10(a): An example of a software code class, using the Nim language.

FIG. 10(b): Screenshot of a section of a worksheet corresponding to the class of FIG. 10(a), with a range of fields selected.

FIG. 10(c): Screenshot of a section of a worksheet corresponding to the class of FIG. 10(a), with a single field selected.

DETAILED DESCRIPTION OF THE PREFERRED EMBODIMENTS

These teachings describe a system and methods for implementing spreadsheet worksheet functions that are able to return multiple calculated values with an arbitrary layout over one or more worksheets. Advantageously, our approach can also be used to automatically populate the input values for a worksheet function.

In computer software, a self-contained functional block of code that has an associated single return value is commonly referred to as a "function". A block of code that does not have an associated return value is commonly called a "procedure". Both functions and procedures can have one or more input parameters, and procedures can have output parameters wherein the values passed into the procedure can be modified for subsequent use by the calling code. In some languages, e.g. Python, multiple values can be returned from a function in the form of a "tuple". More commonly, multiple values are returned by wrapping the values in a separately defined structure (e.g. a "struct" or "record"). Furthermore, the term "argument" refers to the actual value assigned to a parameter, although in practice the terms "parameter" and "argument" are often used interchangeably. In these teachings we will use the terms "parameter", "value" and "argument" interchangeably.

It is also important to note that when the term "value" is used this can correspond to a single value for a single cell, or a set of values for a plurality of cells.

Also, a "range" of cells can include one or more worksheet cells, and that those cells can be contiguous or non-contiguous.

Figure 1:
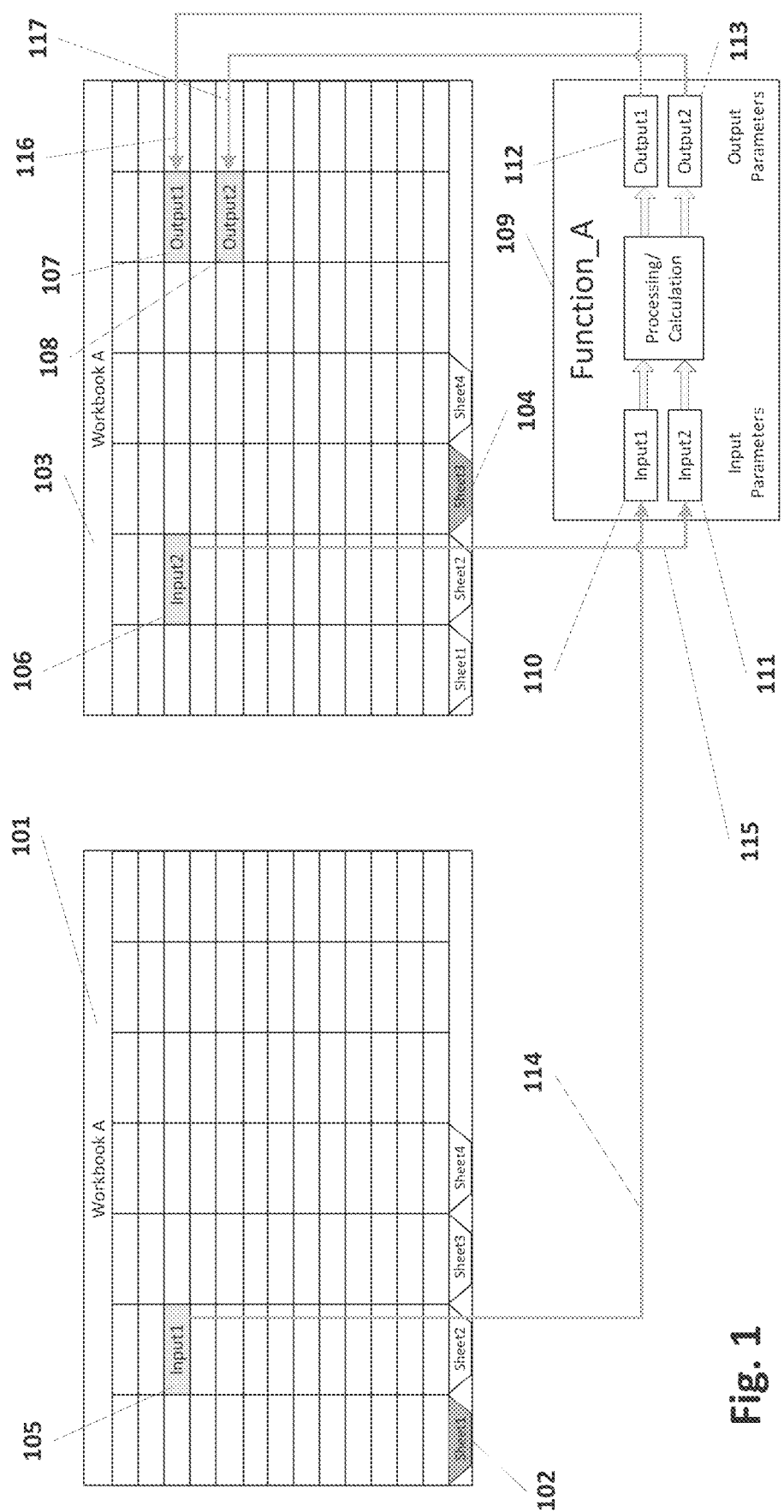
FIG. 1: High-level conceptual diagrammatic depiction of a multi-output worksheet function.

FIG. 1 illustrates, in simplified overview, a high-level conceptual diagrammatic depiction of an example system embodying our approach within a spreadsheet application. In FIG. 1 we show two views of a spreadsheet workbook: a first view 101 where Sheet1 102 is the active worksheet and a second view 103 where Sheet3 104 is active.

Sheet1 102 contains a named cell Input1 105 while Sheet3 104 contains three named cells: Input2 106, Output1 107 and Output2 108. For illustration purposes we assume that Input1 105 can be accessed from any worksheet in the workbook (i.e. it has workbook-wide scope) and that Input2 106, Output1 107 and Output2 108 have worksheet-level scope (i.e. they can only be accessed from within Sheet3 104.

Also shown in FIG. 1 is a schematic of a worksheet function 109 ("Function_A") which has two input parameters (Input1 110 and Input2 111) and two output values (Output1 112 and Output2 113). Advantageously, our approach exploits name-based mappings which in turn determine which cell values are passed to the worksheet function, and also which worksheet cells the function output values are passed to. It is important to realise that this mapping is between properties that are internal to the worksheet function, and named cells (or ranges) on the worksheet itself. In FIG. 1 the mappings are indicated by the connecting lines 114, 115, 116 and 117.

As already described, within the spreadsheet workbook the source and destination cells (or ranges) are defined using named ranges. There are a number of possible approaches to implementing the mapping within the function, and for the purposes of illustration we will now describe an exemplary embodiment based on the use of a software object created by the worksheet function. In this example we will consider the scenario of multiple output values for the function, which therefore involves the use of an output object. The basic principles also apply to input values, which are discussed in more detail at a later point in these teachings.

In FIG. 2 we show a simple interface 201 that defines a number of properties for an output object that will be created within the function. For illustration purposes we have based this on a worksheet function that performs a simple linear regression (e.g. LINEST in Microsoft Excel). The key feature required for an output object is that it exposes so-called Run Time Type Information (RTTI—sometimes referred to as Reflection) which allows the object property names and types to be determined by the system at runtime. For example, in FIG. 2 we have a "DegreesOfFreedom" property 202 which is of integer type: The system retrieves this information at runtime and attempts to map the "DegreesOfFreedom" property name to a named cell/range in the workbook with the same name.

Figure 3:
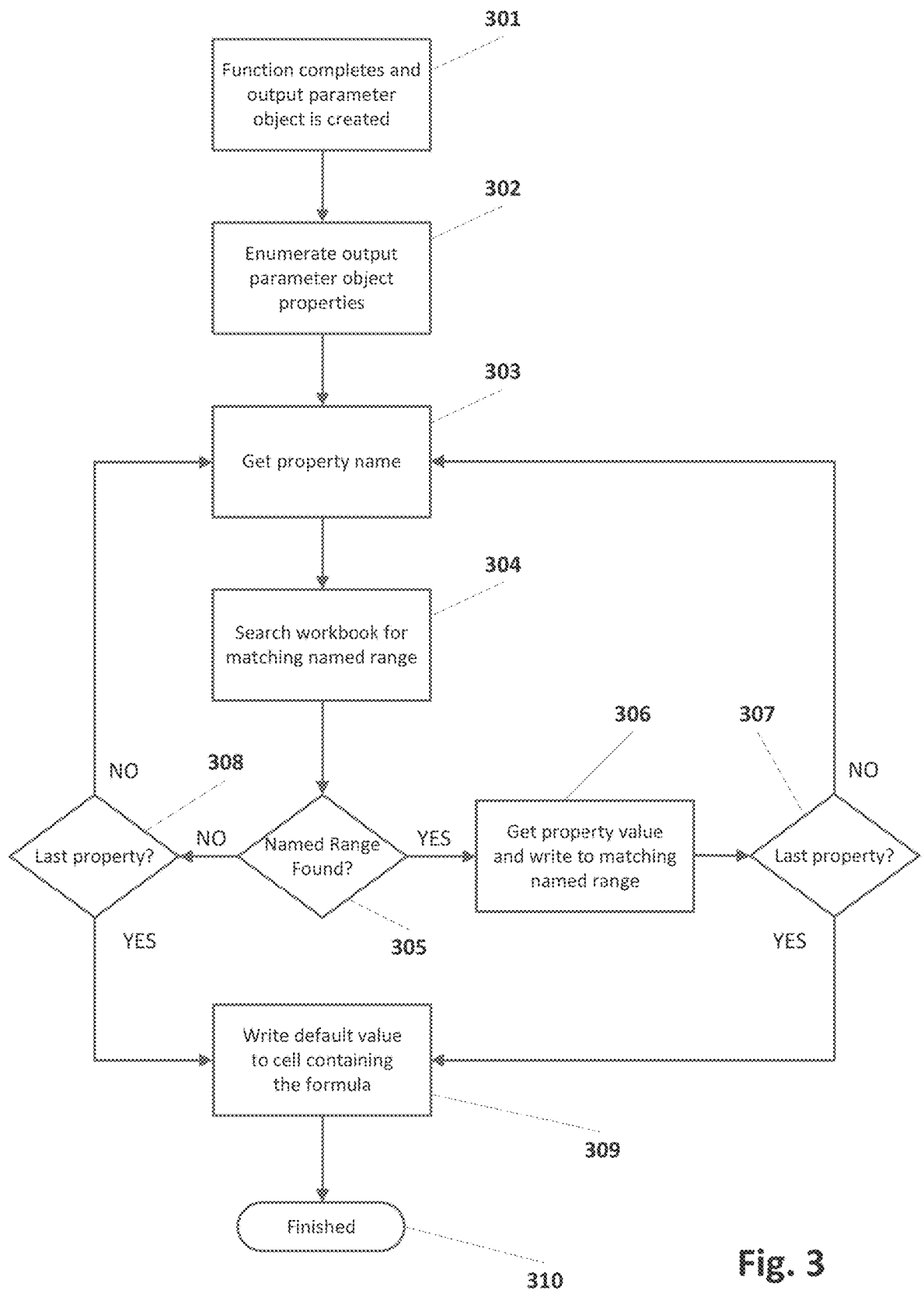
FIG. 3: Flow diagram for passing output values to a workbook.

FIG. 3 shows an illustrative flow diagram for the workflow involved in processing the output object of a multi-output worksheet function. After the function calculations have been completed the worksheet function creates an output object that holds the required output values 301. Code within the function then enumerates each property in the output object and, for each property found, checks for a matching named range (or cell) in the calling workbook. If a matching name is not found then the function simply ignores the output value and moves to the next property. If a matching name is found then the value (or values) for the property is inserted into the worksheet named range.

Advantageously, we can see that the user can customize the output format of the worksheet simply by creating or deleting different named ranges (or cells). This feature can be very useful where only a subset of the output function is required or desired. For example, in certain circumstances we might want to restrict which outputs are presented to different groups of users: Such user groups could be differentiated in terms of experience, permissions etc.

We can also see that it becomes straightforward for the user to specify different layouts for the different output values. The output ranges can be located next to cells with descriptive labels, for example, in contrast to the simple array output of conventional array formulas.

Typically, multiple worksheet functions will be incorporated into a compiled software library which is in turn linked to the application spreadsheet engine. For example, in the popular Microsoft Excel spreadsheet application a compiled function library can be implemented as a so-called XLL, or as a COM add-in. These teachings will assume the use of a compiled library when describing the different embodiments. However, it should be noted that there are other possible ways to implement worksheet functions, and by extension the systems and methods described in these teachings. The Visual Basic for Applications scripting language provided by Microsoft Excel is one example of a script-based alternative.

When building a multi-output worksheet function, the user defines the function outputs, specifying the output name and type (a number, date etc). In a preferred embodiment, internally the function generates an output object with properties corresponding to the defined outputs: this object is specified within generated wrapper code and is embedded within the code of the worksheet function. All of this happens without requiring user intervention—they need only define the output parameters of the worksheet function—i.e. the name and type.

In order to separate definitions from implementation, the output definitions can be stored separately from the user's worksheet function code, e.g. using a format such as XML or JSON. The wrapper code is then generated at the point that the user's function code is compiled into the library file. This in turn means that changes in how the wrapper code is generated will be applied to all appropriate associated worksheet function libraries. It also means that the software code in the function does not necessarily need to be changed when the output definitions are edited, and vice-versa.

The means by which output values are communicated to the workbook can be implemented in a number of ways, and two possible implementation approaches are as follows:

Single Dispatcher Function

Self-contained within each function

In the single dispatcher scenario each function library contains a central function that dispatches the input parameters to the relevant function and receives an output object returned by that function.

The dispatcher function holds a reference to the calling worksheet (and hence the associated workbook) and upon receipt of the output object executes the workflow illustrated in FIG. 3. It searches first the worksheet and then the workbook for ranges with names that match the property names of the output object. If it finds a matching name then it (i) checks the range size against the output size (i.e. single value or array) and then (ii) checks the data types. If everything matches correctly then the dispatcher retrieves the output value and writes it to the matching named range in the workbook.

The advantage of the single dispatcher is that a reference to the calling worksheet is only required at one point: The functions that carry out the processing need have no knowledge of the worksheet.

In the self-contained approach each worksheet function gets a reference to the worksheet and workbook, and handles the population of the output cells directly (using the type of workflow shown in FIG. 3). The type and range checks run are exactly as for the single dispatcher case.

In yet another embodiment, an output object or list of outputs is returned to the spreadsheet engine, which in turn manages the copying of the output values to the matching named ranges (again using the FIG. 3 workflow, or similar). There are a number of ways in which the copying of the output values to the worksheet named ranges can be achieved: The different embodiments described here are intended to be illustrative and do not form an exhaustive list.

Note that the output values generated by the worksheet function can be derived from a number of sources. For example:
  Calculated values
  Retrieved from a web service
  Retrieved from a data source such as a database or file These sources are given for illustration purposes only, and other possible data sources, and variants of the above, will be apparent to those skilled in the art.

It is important to realize that the creation of an internal object which is queried using RTTI/Reflection is only one possible implementation, and a number of others can be implemented. One alternative is to use an output parameter list, with each item in the list consisting of either a simple record (sometimes known as a "struct") or a simple object. The record or object would have at least the following fields:
  ParameterName
  ParameterType
  ParameterValue Defining Outputs on a Worksheet On the worksheet where the function is to be used, the user must define named cells (or ranges for array outputs) with names that correspond to the names of the function output parameters. In a preferred embodiment each library will have a standard query function that returns a list of available functions and the names of their input and output values and the corresponding types.

The provision of such a standard function allows users to easily define named input and output cells and ranges. In a preferred embodiment, the system will provide a user interface (e.g. in the form of a software wizard) that simplifies the process of associating named cells/ranges with function input and output values. For example, there might exist a conflict between an existing named cell that should not be over-written (a cell with a formula is one case) and the user interface should notify the user of such conflicts.

Defining Input Parameters

Although worksheet functions as implemented in some existing spreadsheet applications can use named ranges in their argument lists, the user must still type the names into the argument list for the function. Advantageously, the approach proposed in these teachings provides a means for automatically populating the input values required.

As with output values, mapping of input values also relies on named cells (or ranges) being matched to input parameter names. Advantageously, this approach also allows us to make any number of the input arguments optional in the list, even although they might be required within the function.

Note that this is a different case from that where one or more input parameters are truly optional and it is important to distinguish between these two types of optional input parameter:
  Where a parameter is optional due to the presence of a matching named cell that contains the input value (the focus of these teachings)
  Where a parameter is optional due to an internal feature of the function itself (i.e. where the default value will be supplied by the function)

The second of these cases is commonly used in spreadsheet worksheet functions and general software development and will not be considered further here. In practice, omitted parameters must either be at the end of the list or be indicated by some form of custom syntax, such as an empty parameter between commas.

There are a number of different ways in which input parameter lists can be specified. Note that in these teachings we assume that we are working with a multi-output function, although the mechanism of named-range mapping for input parameters will obviously also apply to a standard single-output function.

In a preferred embodiment the function parameter list would have the following layout:
  FunctionName(Title, InputsWorksheet, [Params])

Where [Params] signifies an array of input parameters in addition to the title and worksheet parameters.

Title: This is the title text that should be displayed in the cell containing the function call (the "containing cell"). In other words a multi-output function will return a string value as it's standard output to the containing cell. This is in contrast to standard single-output functions, where the return value is displayed in the containing cell. In a multi-output function three possible scenarios for the containing cell are:
  The function simply returns the title that was passed in via the parameter list
  An error occurs in the function and it returns an error message or code to the containing cell
  If the user does not specify a title parameter, or if the title argument is empty, then the function returns a default title that has been pre-specified in the function's software code The use of the containing cell to display a title is a convenient way to handle a standard return value for a multi-output function.

If no matching input names are found in the workbook then the function should return an error message indicating "No inputs found" to the calling cell. If no matching output names are found in the workbook then the function should return an error message indicating "No outputs found" to the calling cell.

InputsWorksheet: In the simplest embodiment this parameter is a worksheet name that holds all the required named input cells. In a second embodiment this comprises an array of worksheet names that contain the named input cells. By specifying one or more worksheet names we can force the function to search only those worksheets for the named cells. This in turn allows for multiple instances of a named cell (or range).

For example, a workbook with worksheets called "Sheet1" and "Sheet2" can have named ranges with the same name, as long as the scope (or visibility) of those names is constrained to the worksheet level. This is standard practice in common spreadsheet applications. By using worksheet-scope named ranges a single workbook can contain multiple instances of a multi-output worksheet function. For input values there will sometimes be advantages in having workbook-scope named ranges. For example, cells that contain values of physical constants (freezing temperature of water, Pi, etc) or a standard fixed value (e.g. an interest rate).

Figure 4:
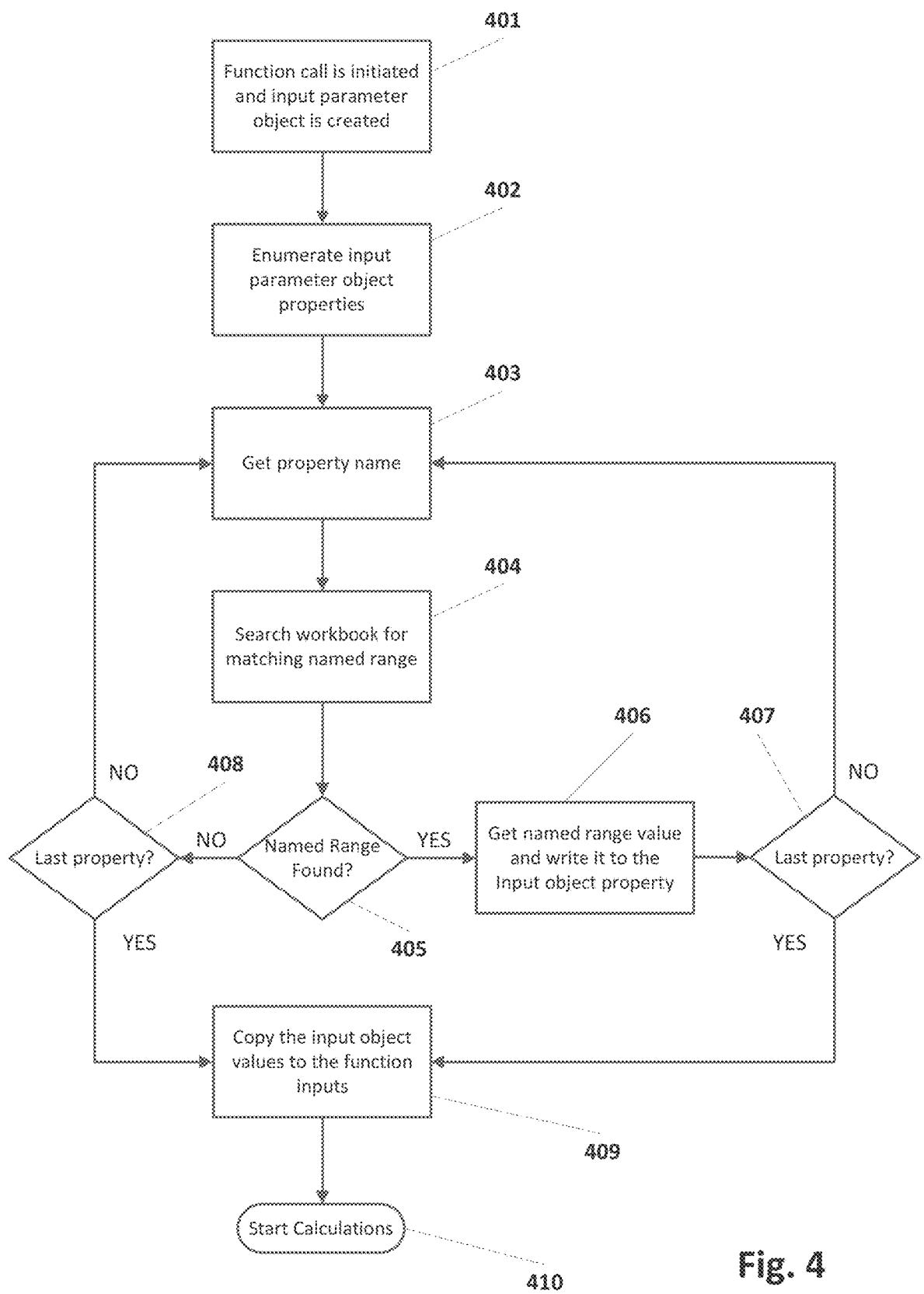
FIG. 4: Flow diagram for automatically building an input parameter list.

[Params]: If an input parameter has been left blank then the function searches for named cells that match the specified input names for the function. This is illustrated by the workflow shown in FIG. 4. Note that this is essentially the same as the workflow for the output values, but with the direction of data flow obviously reversed.

Consider an example where we have a function "Fund" that requires two inputs (Input1, Input2). Two possible syntax examples for entering the formula in a cell are as follows:

=Func1(Title, InputsWorksheet): In this case we have not specified any additional parameters in the function call, only the title and the inputs worksheet. The function will search for named cells Input1 and Input2 and if they do not exist will return an error message in the calling cell.

=Func1(Title, InputsWorksheet, R5C5): In this case we override the naming convention and specify cell R5C5 as an input cell. Because we are using name-based mapping this form of the syntax allows us to mix reference-based inputs into the parameter list at any point. For example, the workflow of FIG. 4 can be modified in the following way:

Enumerate the properties while incrementing an index value

Store the index of any missing named ranges in the parameter list

After completing the enumeration scan the input list for reference-based inputs

Attempt to match any reference-based inputs to gaps in the named-range list

The above examples are obviously only two possible example formats: Other possibilities based on the preceding teachings will be obvious to those skilled in the art.

Note that the multi-value approach described in this document does not rely on associating a complex object with a worksheet cell, in contrast to other approaches. Rather, any multi-value objects remain associated with the worksheet function and only the function's output values are associated with the worksheet. In addition, our approach does not require any need for object lifetime management, as is often the case in approaches involving cell objects.

Spreadsheet Applications

Advantageously, by combining automatic input parameter population with multi-output functions users can create spreadsheet-based applications with different functional entities based on worksheet templates that already contain the required named ranges.

For example, using the previously mentioned regression example, the user could create a template worksheet for the regression model input parameters (a "dialog" worksheet) and a separate template worksheet for the regression calculation outputs.

In a preferred embodiment, the spreadsheet application allows customization of the menus through the provision of a scripting language, as well the creation of new worksheet functions. An example of this is the Visual Basic for Applications (VBA) scripting language provided by Microsoft Excel, which allows the user to add new menu items linked to functional scripts. Such scripts can be configured to create new worksheets from templates.

In a further embodiment, the system described in these teachings can include so-called dialog forms that are used to simplify the specification of the input parameters. A dialog form differs from the dialog worksheet described above in that it is a software object created specifically for handling user input. The VBA scripting language mentioned above has such a capability, as do the compiled-library approaches (e.g. XLLs, COM add-ins or any other compiled code library). The same name-mapping approach described in these teachings can also be used to map the input controls of a dialog form to the input named ranges used by a function.

Figure 5:
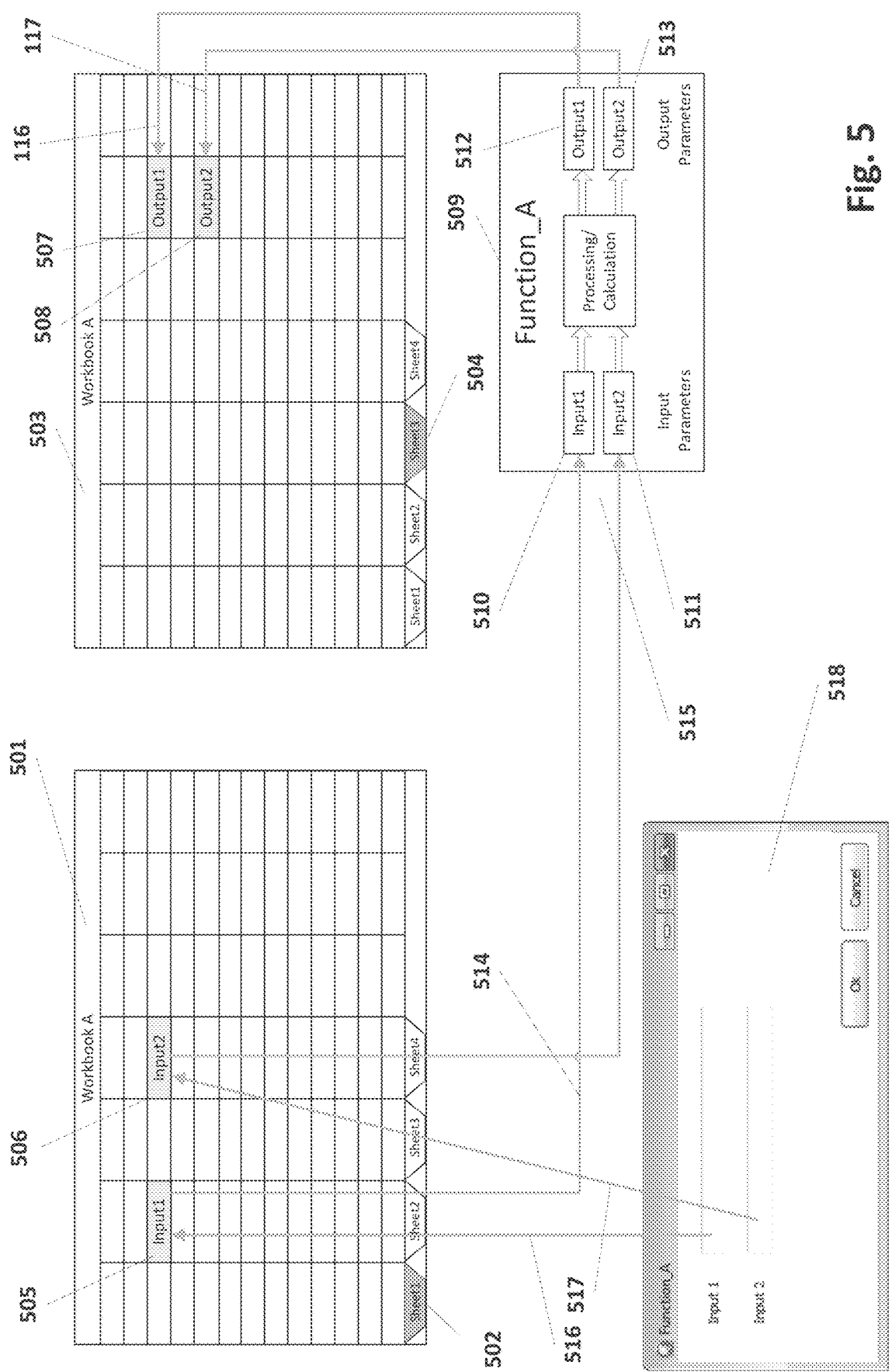
FIG. 5: Mapping a dialog form to function inputs.

In FIG. 5 we show a variant of the scenario illustrated in FIG. 1. In FIG. 5 we have two differences:

The input named cells are located on a single input (or dialog) worksheet (Sheet1—502)

The input named cells are mapped (516, 517) to the input controls of a dialog form 518

Note that the input named cells need not be located on the same worksheet: We are simply illustrating the use of the dialog worksheets described in these teachings. In a further embodiment the dialog worksheet can be hidden from the user, which in turn can provide greater control over the entering of the input values.

Multiple Instances of a Mapped-Parameter Function

Spreadsheet worksheet functions can be broadly classified into intermediate-type functions and reporting-type functions. An example of an intermediate function is the OFFSET function: The result of using OFFSET is unlikely to be of interest on its own—it is typically used for intermediate calculations in larger models. An example of a reporting function would be the LINEST linear regression function, where the calculated outputs are likely to be the final result required by the user. Any further use of LINEST output is most likely to be in further reporting, such as in charts.

So far, the systems and methods of the current teachings describe a situation where only one instance of a multi-output worksheet function can reside on a worksheet. Adding two or more of the same function to a given worksheet would obviously lead to a conflict when outputting the values to the named ranges. Multi-output worksheet functions are most likely to be reporting-type functions and in practice this single-instance limit will rarely be a limitation.

For circumstances where more than one instance is required then a simple modification to the input parameter list provides a solution. Specifically, a further embodiment wherein a prefix parameter is included in the list of inputs allows a function to distinguish between multiple named input and output ranges.

For example, extending the "Fund" example described above we can have:

=Func1(Title, InputsWorksheet, 'InstA_')

Once again we have not specified any additional input parameters in the function call, only the title and the inputs worksheet and a new parameter "InstA_". "InstA_" is a prefix (or it could be a suffix) that is appended to any names involved in inputs or outputs. In this case the function will search for named cells InstA_Input1 and InstA_Input2, and similarly for any output names. In this way we can have multiple instances of Func1 on the worksheet.

Note that the earlier example of mixed reference and name-style inputs is also a useful approach to handling multiple instances of mapped-name functions.

In order to warn the user of named-parameter conflicts, a preferred embodiment includes a tag indicating that a worksheet function uses name-mapping. When such a function is added to a worksheet the spreadsheet engine should check for other mapped-name functions that use the same named ranges. This is particularly important for output ranges: In some cases mapped input ranges can be shared amongst multiple functions without conflict. If a conflict is detected then an error message should be returned in the calling cell. Schemes for testing conflicts will involve standard software methods and will be obvious to those skilled in the art.

These teachings have so far discussed a name-matching architecture wherein the basic execution workflow is as follows (for the scenario where we have a worksheet function that exploits only name-matching of outputs, as described in FIG. 3):

- A recalculation of the spreadsheet worksheet is initiated through user intervention (e.g. by an explicit request or by changing a cell value).
- The spreadsheet engine passes the input values to the worksheet function.
- The worksheet function processes the input values and generates one or more output values.
- The dispatcher matches the output variable names to any existing matching named ranges and populates the cells of the matched named ranges with the appropriate output values.

In the above workflow we can see that the name-matching process is effectively triggered from the spreadsheet engine, since it is via the spreadsheet engine that the recalculation is managed. We can regard the worksheet function as the code execution engine, or environment, and said execution engine is therefore managed via the spreadsheet engine. We now consider alternative name-matching architectures wherein the name-matching process is triggered from the code execution engine rather than from the spreadsheet. The first example of such an architecture we consider is that of the interactive coding (or scripting) environment, usually referred to as a "REPL."

Note that, as per the workflow described in FIG. 3, we will sometimes refer to the dispatcher as the "name-matching dispatcher" in these teachings. Note also that we will use the terms "code execution engine" and "code execution environment" interchangeably.

Introduction to Interactive Coding Environments

An interactive coding environment, in its most commonly implemented form, involves a simple software code editor user interface (UI) wherein the user can type individual or multiple lines of code, evaluate the code, and display the results. In these teachings we will sometimes refer to the use of an interactive coding environment by a user as an interactive session or an interactive code session. The concept of a session is not simply the time spent by the user writing code, but comprises the state of the system in its entirety, including software variable values and software code.

Figure 6A:
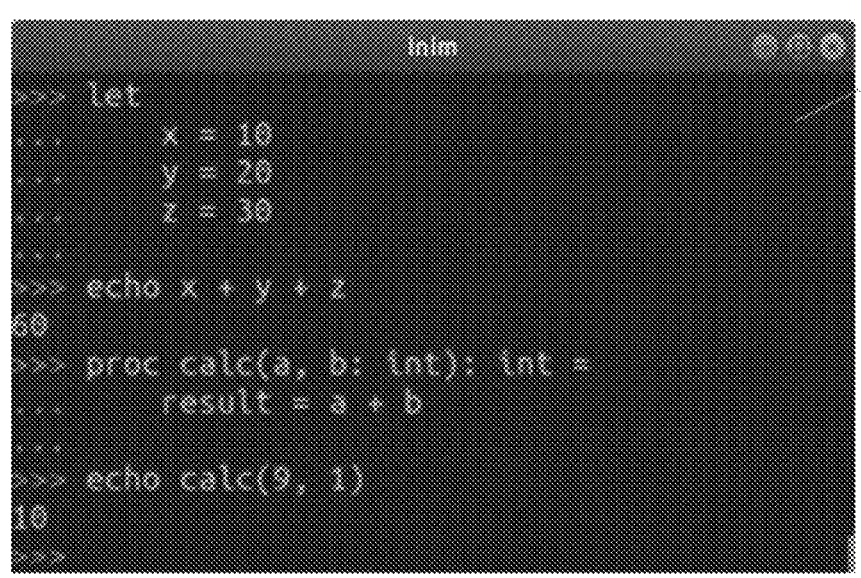
FIG. 6(a): Screenshot of a typical interactive coding user interface (UI).
Figure 6B:
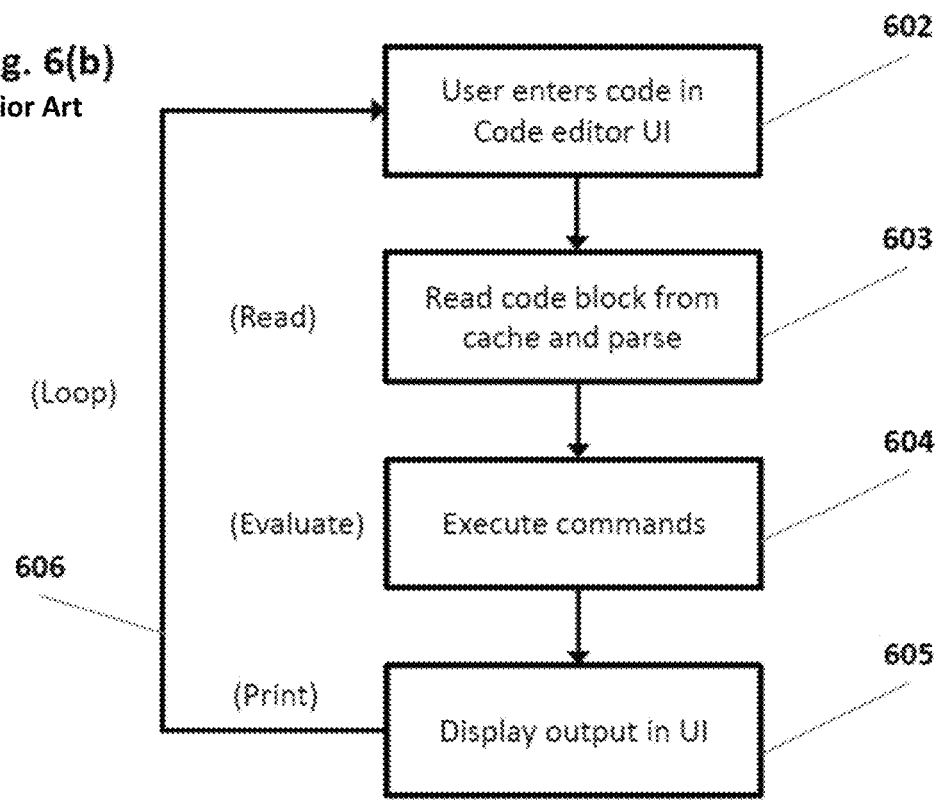
FIG. 6(b): Workflow for a generic interactive coding environment.

A screenshot 601 of a typical interactive coding user interface (UI) is shown in FIG. 6(*a*) where we can see that the user has (by typing the code into the code editor):

- Defined three variables x, y and z and set a value for each of them
- Then called the "echo" command to display the sum of the three variables
- Then defined a function called "calc" that returns the sum of two integers
- Then combined the "echo" command with a call to "calc" to display the sum of 1 and 9

The workflow for a generic interactive coding environment is shown in FIG. 6(*b*), with the step 602 of entering code in a code editor UI being the start point of the process. Depending on the detailed implementation, different combinations of key strokes are used to signify the end of a code block (e.g. a simple "Enter" for a single code line), which in turn signifies that the code block is ready for processing. As the user types, the entered code will normally be stored in some form of cache. At the point the end-block key combination is entered, the code block is read from the cache and passed to some form of code parser at step 603. The parser decomposes the code into commands that are passed to some form of execution engine at step 604. The resulting output is then displayed in the UI at step 605. The process then repeats as indicated by arrow 606 as the user enters more code into the editor.

As already mentioned, an exemplary interactive coding environment is also known as a REPL (Read-Evaluate-Print-Loop, where the "Print" is equivalent to the display step 605 in FIG. 6(*b*)). We will use these terms interchangeably in these teachings, as well as interactive scripting environment.

Interactive coding environments are very popular due to the immediacy of the interplay between code and results: Users can quickly explore different algorithms before building a more formal software application. For example, a user who is developing a spreadsheet worksheet function can quickly test different implementation ideas in this type of environment.

Interactive environments are most commonly implemented using interpreters where the code syntax is evaluated at runtime within an interpreter session. The advantage of using an interpreter is that the state of any existing variables is not changed as new code is added. Rather, the variables' state is stored within the memory space of the interpreter session. Any existing code is also typically preserved in-memory.

The interpreter approach is in contrast to compiled code. When compiled, software code is converted to a low level format that is executed directly by the computer CPU. Each time new code is added it must be re-compiled to low-level code, and there is normally no preservation of state for any variables. Implementation of an interactive coding environment is possible using compiled code, but requires sophisticated techniques such as "hot-code-reloading" where the state of the variables and any existing code is preserved.

In an extension of the interactive coding environment paradigm, environments that are linked to spreadsheet workbooks have been demonstrated. However, in these implementations the state of the variables is still held within the interpreter session, and explicit commands are used to write the values of those variables to, or read values from, the spreadsheet workbook. That is, the commands that read/write values from/to the worksheet are explicitly entered by the user and, importantly, form part of the code body created by the user. In terms of core architecture and implementation, therefore, these systems are similar to other spreadsheet scripting solutions, such as Visual Basic® within Microsoft Excel®, wherein the user explicitly writes the code that interacts with a workbook.

Name Matching in Interactive Coding Environments

Advantageously, the name-matching approach described in these teachings provides a means of implementing a novel type of interactive coding environment linked to a spreadsheet workbook, wherein the interaction between the code and the workbook is managed automatically in the background thus eliminating the requirement for user intervention. As in the implementations described earlier in these teachings involving worksheet functions, this is achieved by matching the names of software code variables to named ranges in the spreadsheet workbook.

Figure 7A:
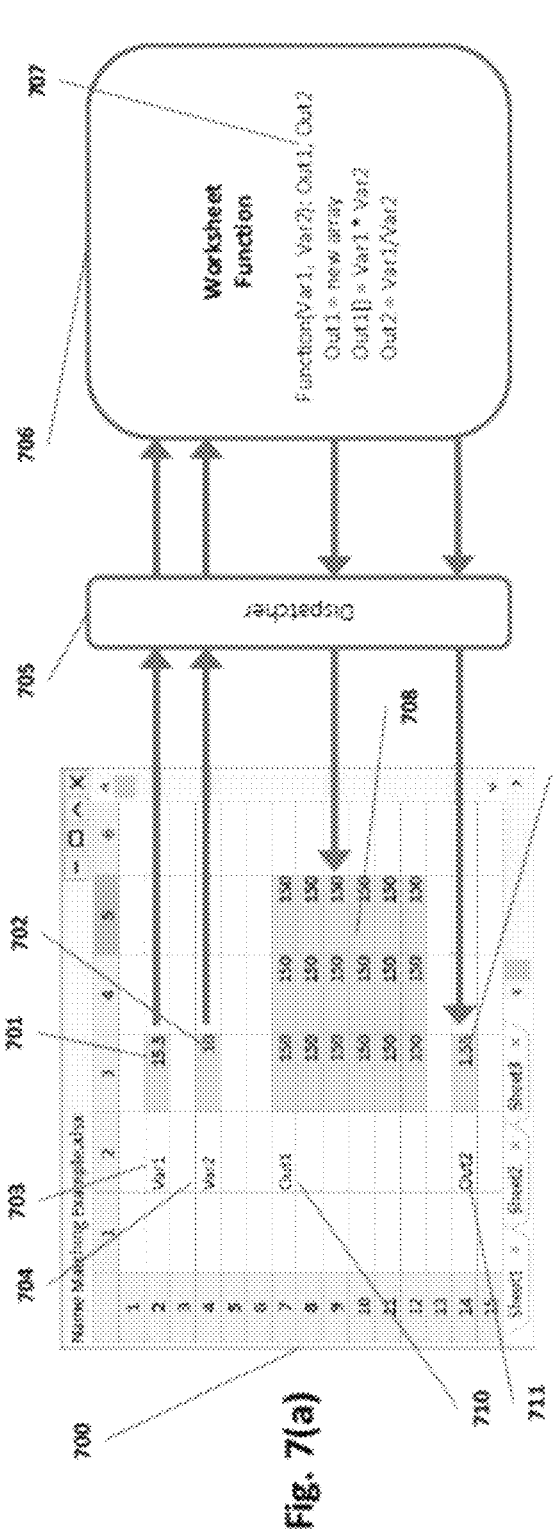
FIG. 7(a): Exemplary worksheet function architecture linked to a spreadsheet workbook.
Figure 7B:
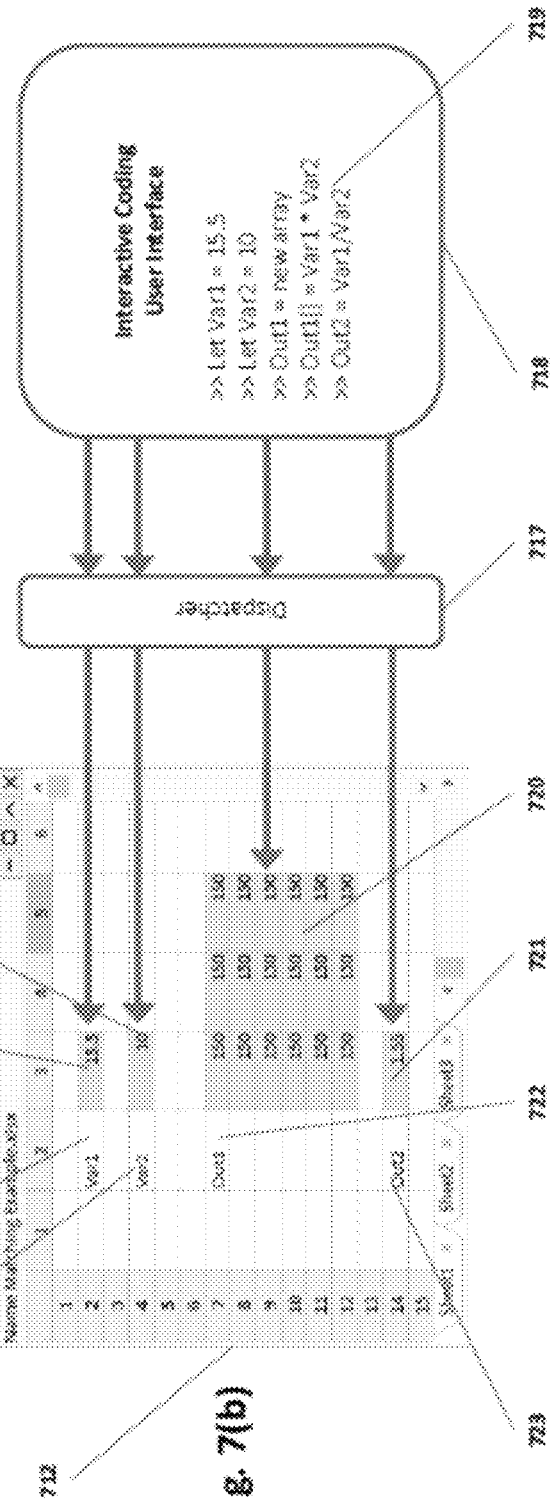
FIG. 7(b): Exemplary interactive coding environment architecture linked to a spreadsheet workbook.
Figure 7C:
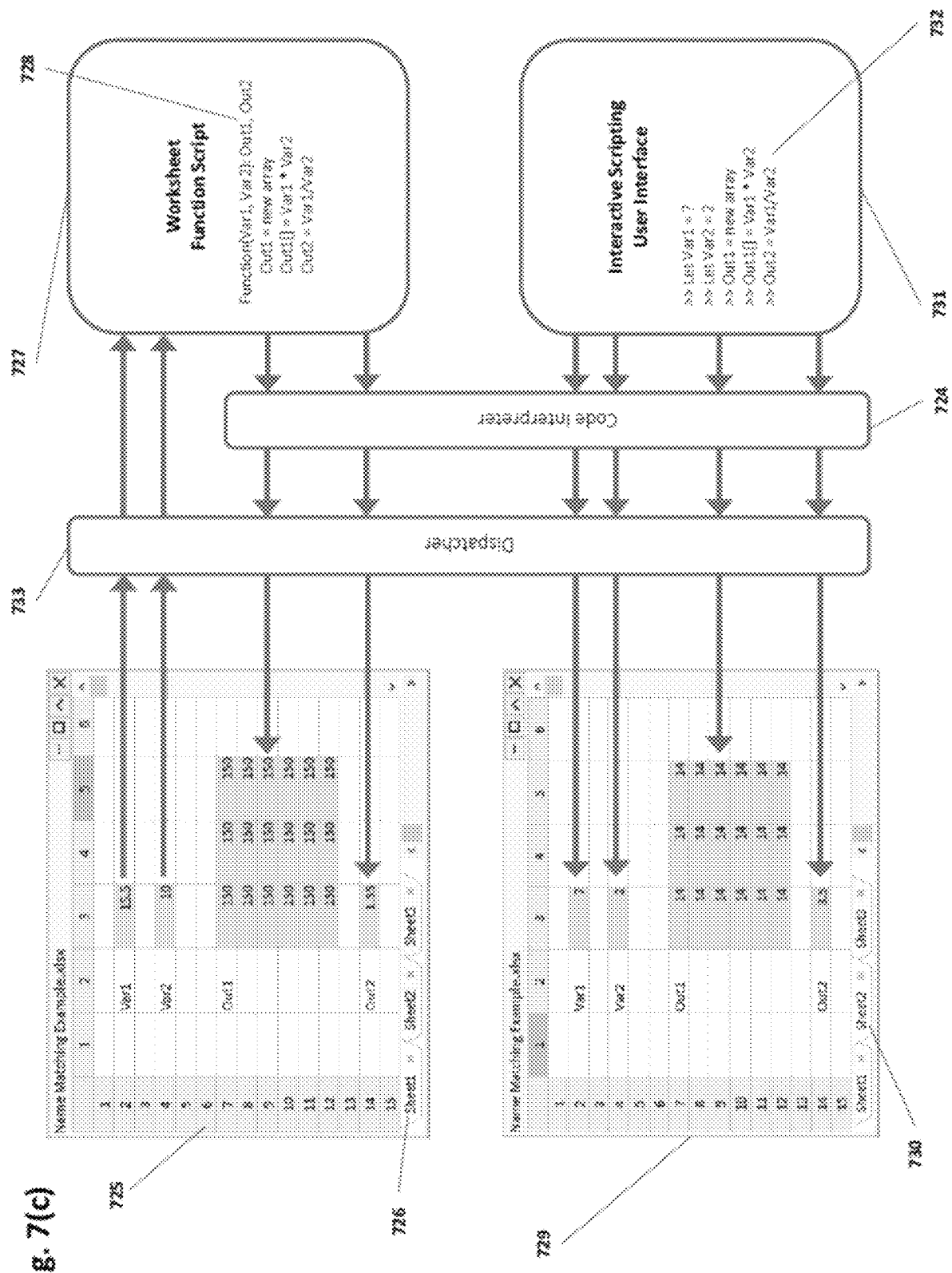
FIG. 7(c): Alternative exemplary implementation comprising a software code interpreter operating between both an exemplary worksheet function architecture and an exemplary interactive coding environment architecture linked to a spreadsheet workbook.

In FIG. 7 we show both the worksheet function architecture described earlier in these teachings (FIG. 7(*a*)) and an exemplary architecture for the proposed interactive coding environment (FIG. 7(b)), each linked to a spreadsheet workbook. The purpose of FIG. 7 is to elucidate the differences in data flow between the two architectures. We stress that these are purely exemplary and that other implementations of each scenario (worksheet function and interactive environment) are possible, as will be further appreciated with reference to FIG. 7(c) described further below. For example, FIG. 7(a) illustrates worksheet function name matching for both inputs and outputs in order to better illustrate the data flow and therefore illustratively combines the workflows described by both FIGS. 3 and 4.

In both FIGS. 7(a) and 7(b) the spreadsheet worksheets 700 and 712 are assumed to be identical. For example, cells R2C3 (701 and 713) and R4C3 (702 and 714) are named cells with names Var1 and Var2 and contents 15.5 and 10, respectively. The text in cells R2C2 (703 and 715) and R4C2 (704 and 716) are labels and act only as visual indicators for the user. We also assume that the worksheets have been created in advance with all pre-defined named ranges.

As described earlier in these teachings in the context of worksheet function name-matching, FIG. 7(a) includes a name-matching dispatcher 705 for the worksheet function. From FIG. 7(b) we can see that the proposed interactive environment also comprises a name-matching dispatcher 717. The dispatcher 705, 717 handles both the name-matching and dispatch of values to and from the named-ranges and we refer to it as either "name-matching dispatcher" or simply "dispatcher". As already mentioned, for worksheet function outputs the name-matching/dispatch process is described by the workflow shown in FIG. 3, and for inputs the workflow of FIG. 4 applies.

With continued reference to FIG. 7(a), in the worksheet function schematic 706 we show some simple pseudo-code 707 that describes how the inputs Var1 and Var2 are processed to populate the outputs Out1 and Out2. The line comprising Out1[ ]=Var1*Var2 is pseudo-code for setting all members of the array Out1 equal to Var1*Var2. The variable Out1 in the code is matched to the named range Out1 708 in the worksheet 700 with cell R7C2 710 again containing a simple label for the user. The same matching process is also applied to Out2. The direction of the arrows in FIG. 7(a) indicates the direction of data flow: Inputs flow from the spreadsheet to the code, and outputs flow from the code to the spreadsheet, again through the dispatcher 705. This process has been described fully earlier in these teachings and is restated here for comparison purposes.

For the proposed interactive environment 718 in FIG. 7(b) the data flow differs from the worksheet function architecture in that data flow exists solely from the code variables to the spreadsheet. To further illustrate this, we show some pseudo-code 719 intended to match the functionality of the worksheet function pseudo-code in FIG. 7(a). We also show typical double-chevrons in code 719 to indicate the interactive nature of the user interface 718. Similar to the process described for FIG. 6, the user first defines Var1 and then uses the "Enter" key on their keyboard to indicate the line is complete. At this point the dispatcher 717 checks the worksheet 712 for a matching named range finds Var1 at R2C3 and enters the value 15.5 in the cell 713.

We emphasise that the underlying method of name-matching of variables to named ranges via the dispatcher is the same in the two architectures: The important difference between them lies in how the name-matching process is triggered. In a worksheet function the code that comprises the function is executed in its entirety and one or more outputs are calculated and dispatched to the workbook. The worksheet function code is executed when a recalculation of the worksheet is initiated.

In contrast, the proposed interactive architecture allows the user to execute code one line at a time, or as a group of code lines, with the granularity of the executed code being under the control of the user. The execution of the code is of course initiated from the code UI, rather than from the spreadsheet, and the dispatcher is in turn managed by the code execution engine.

The common function of the dispatcher 733 in the two architectures is illustrated in FIG. 7(c) where we show an alternative exemplary implementation comprising a software code interpreter 724 that operates to both (a) evaluate worksheet functions and (b) evaluate code entered from a REPL UI within a spreadsheet-based application. We also show a workbook screenshot 725 with Sheet1 726 as active, wherein Sheet1 comprises a worksheet function as described for FIG. 7(a). The worksheet function schematic 727 and worksheet code 728 are as already shown in FIG. 7(a).

We also show a separate screenshot of the same workbook 729 but in this case with Sheet2 730 active. We also show the interactive UI schematic 731 as in FIG. 7(b), but with code 732 having different values for the variables Var1 and Var2. The changed values are reflected in the worksheet 730. Again, a single dispatcher 733 operates across both architectures.

To further elucidate the use of a dispatcher with an interactive coding environment, we refer to the workflow shown in FIG. 8, where we observe that the name matching process is triggered by the user entering the key combination that defines the end of a code block at step 801. The new block of code is then parsed at step 802 and all variable names identified and added to a variables list at step 803. A particular variable name of interest is selected at step 804, and the list is then scanned at step 805 and if a named range is found that matches the variable name as indicated at block 806 then the value is written to the named range at step 807. At block 808 it is inquired whether there are any more variables of interest to search the workbook for: if so, the process repeats at step 804 for the next variable; and if not, the process ends as indicated at block 810. Moreover, if any named range or variable of interest is not found at block 806 so as to be written to the named range in the workbook at step 807, it is again queried at block 809 whether there are any more variables of interest to search the workbook for, leading to either further scanning at steps 804 and 805 or ending the process at block 810.

Note that throughout these teachings we will often refer to a variables' value in the singular for convenience. Whenever we use this convention it should be understood that we also include multi-value variables (e.g. an array) in which the matching of the variable name to the named range involves writing multiple values to the worksheet.

Referring again to FIG. 6 we can see that there are three variables which have their values set, i.e. x, y and z, and these form potential candidates for name-matching to a spreadsheet workbook. In contrast, we can also see that the call to the "calc" function does not involve assignment to a variable: The result is simply printed to the output window. Those skilled in the art will appreciate that all of these code lines could in principle be combined into a single worksheet function and subsequently executed in their entirety.

To reiterate, we can see that the important difference between the worksheet function architecture and the REPL architecture is in how the name-matching and dispatch is triggered. In the worksheet function it occurs when the function has completed processing and in the proposed interactive environment it occurs when the user initiates it from the coding environment.

We can therefore summarize the two architectures as follows:

Worksheet function: The process is initiated by the spreadsheet engine after a recalculation request from the user.

Interactive coding UI: The name-matching process is initiated by the user via the interactive coding user interface.

Those skilled in the art will appreciate that there are a number of ways in which the proposed interactive architecture could be implemented as a data processing system. In the case of worksheet functions discussed earlier, these are most commonly implemented as running within the same software process as the spreadsheet engine. This is not mandatory since the spreadsheet engine, the name-matching dispatcher, and the worksheet function could all execute in separate software processes.

The same logic applies to the proposed interactive architecture, or REPL: Implementation can be in a single software process or across multiple processes.

As in the worksheet function name-matching discussed earlier in these teachings, we can control which variables are written to the spreadsheet by the presence or otherwise of their matching named ranges. For example, in FIG. 7(b) we could prevent the value of Out2 being written to the worksheet by clearing cell R14C3 721 of its name Out2. The workflow in FIG. 8 obviously assumes that the user is working with a spreadsheet workbook with pre-defined named ranges.

The configuration described in FIG. 7(b) allows users to interactively explore different algorithms and output formats for a calculation in a convenient and flexible manner.

Interactive Coding Session State Persistence

The unstructured nature of an interactive coding environment introduces other differences that the name-matching approach is advantageously positioned to exploit. One of these is the lack of differentiation between inputs and outputs from the point of view of the name-matching dispatcher. In worksheet functions inputs and outputs are well defined, and name-matching allows us to define novel user interfaces for spreadsheet users by customizing the layout of both the input and output named ranges.

In an interactive environment, in contrast, there will often be no clear indication of which variables should be regarded as inputs and which as outputs. In fact, it is likely that most of the variables defined in the code will be intermediate variables, i.e. those used in the process of deriving output values from inputs.

As a consequence, name-matching between the software code and a spreadsheet workbook in an interactive environment can be used as a means of automatically tracking and storing the state of all variables in the interactive session. Therefore, all variables can be regarded as outputs, irrespective of their function within the software code itself.

Although we have so far focused on the variable-state tracking utility of linking an interactive environment with a spreadsheet workbook via name-matching, the named ranges in the spreadsheet workbook will still reflect any calculated values, such as desired outputs.

Auto-Creation of Named Ranges

In order to track the state of an entire interactive session we obviously need to ensure that there is a matching named range defined for every variable in the software code. In practice this could become onerous and error prone.

Figure 9:
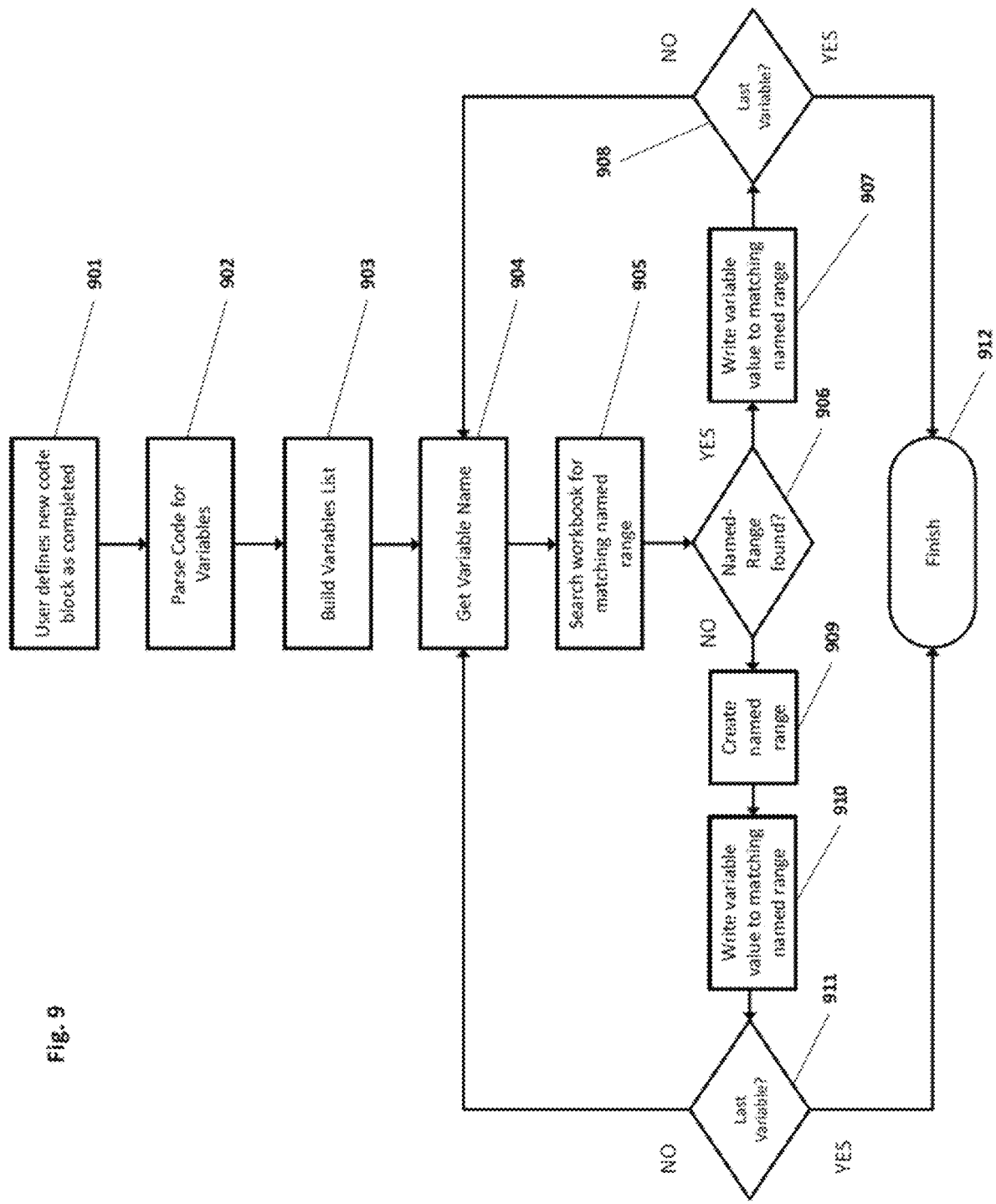
FIG. 9: Alternative exemplary workflow for an exemplary interactive coding environment architecture linked to a spreadsheet workbook.

Advantageously, the name-matching approach allows an interactive environment to automatically create a matching named range in the workbook whenever the user defines a new variable in the code. The operation of this feature would be optional and controlled through a user-editable system setting. The workflow that illustrates this configuration is shown in FIG. 9, which we can see is a simple extension of the workflow in FIG. 8 and where we assume that the named range auto-create option is active. If a matching named range is not found at step 905 per the query indicated at block 906 then one is created at step 909 and the value written to this new named range at step 910.

In a preferred embodiment, the workbook would comprise a single variables worksheet (e.g. with the name "Session_Variables") containing all single value variables in a column. In practice the system would provide a means for the user to define a default name for the variables worksheet, or to define a name upon creating a new interactive session.

Optionally, the worksheet would comprise an additional column holding text allowing the user to identify easily each value (i.e. a "labels" column). The use of a single variables worksheet simplifies the creation and viewing of the variables, but is not the only implementation approach. For example, the system could be configured to store a single variable per worksheet.

The use of a single worksheet per variable is a convenient embodiment where the variable comprises an array of numbers (whether 1- or 2-dimensional), or a Dataset (sometimes known as a DataFrame). For the purposes of these teachings we will use the term "array" to cover all of these array-like multi-value data types or sets.

Use of a single worksheet per variable is particularly useful where the array is not fixed in size (i.e. it is a so-called dynamic array) and where we therefore require to name-match the array variable to a dynamic named range on the worksheet. Obviously in such a case we would not be able to stack array variables on the Session_Variables worksheet because we do not necessarily know their size beforehand.

Other data types that can benefit from a single worksheet per variable are classes and records (the latter also being known as structs). In a preferred embodiment the structure of these more complex types can be represented on a worksheet using nested named ranges, as shown in FIG. 10. In FIG. 10(a) we show a definition of a Customer class 1001 using the Nim language, with five members (firstname, surname, etc.). Records (structs) have the same structural form. In FIG. 10(b) we show a screenshot 1002 of a section of a worksheet with the range R1C2:R5C2 1003 selected, from which we can see from the address box 1004 that this selection is a named range with the name "John_Smith".

In FIG. 10(c) we show the same worksheet 1005 with the R1C1 cell 1007 selected. From the address window 1006 we see that R1C1 1007 is a named cell with the name "First_Name". The range R1C2:R5C2 1003 (FIG. 10(b)) therefore represents a customer object or class and the R1C1 cell 1007 represents the firstname member of the class.

In a preferred embodiment the spreadsheet workbook could contain a combination of pre-defined and auto-defined named ranges. For example, the user might want to explore different data layouts in the workbook but at the same time need to store the entire state of the session. In this case the user would create the worksheets with the required named ranges, and the system would auto-create additional named ranges and container worksheets as required.

Advantageously, the system proposed in these teachings therefore allows the user to define a number of different operating modes with regard to the spreadsheet workbook:

1. Attach the interactive code session to an existing spreadsheet workbook with pre-defined named ranges.
2. Attach the interactive code session to an existing spreadsheet workbook with no pre-defined named ranges and the auto-create option active for named ranges.
3. Attach the interactive code session to an existing spreadsheet workbook with pre-defined named ranges and the auto-create option active for named ranges.
4. Auto-create a spreadsheet workbook with the variables layout format as specified by the user (e.g. one variable per worksheet or a single worksheet for multiple variables etc.) and with the auto-create option active for named ranges.

Suffixes and Prefixes

With reference to FIG. 6(a), we earlier described the variables x, y and z as candidate variables for name-matching. In practice, however, available spreadsheet engines prevent the use of such simple named ranges. One possible embodiment would therefore involve the imposition of constraints on the variable names that could be used in the software code. Although this might actually be preferable in certain applications, in general it would be an inconvenience for the user.

A superior embodiment is to augment the variable names with a pre-defined suffix or prefix, and to use the augmented names for the named ranges in the spreadsheet workbook. In practice the user need never be aware of the suffix or prefix, since it would be automatically added to all variable names irrespective of whether their name as defined in the code is compatible with the spreadsheet. Conversely, when searching for matching named ranges in a workbook the system would automatically remove the standard suffix (or prefix) from the named range before checking for a match with a variable. Name-matching between code variables and named-ranges would therefore proceed as normal without imposing any restrictions on the user.

The default suffix or prefix could be defined at a global level and could be the same across all sessions, or could be generated for each session. An example of the latter is to use the date and time when the session is created. In this case the value of the "x" variable in FIG. 6 might be stored in a named range called "x_20191120_1145".

In an alternative embodiment, the type of the variable could be attached to the range name in the worksheet. For example, the integer type of "x" in FIG. 6 would be stored in the name of the cell, i.e. as "x_integer".

Auto-Creation of Variables in Code

In a further embodiment the user defines a named range in the workbook and the system checks for the existence of a matching variable in the interactive session code. If no matching variable exists then one is created in the code.

This type of embodiment, i.e. auto-creation of variables in code from existing named ranges, is a potentially convenient mode for working between the spreadsheet workbook and the interactive code window. This operating mode would normally be integrated into the system as an option that could be enabled by the user.

Restoration of State

In the case where the code session is attached to an existing workbook upon start-up, our name-matching approach advantageously allows the state of the defined variables of a previous interactive coding session to be re-built using the named ranges and associated values found in the workbook. The workflow for this embodiment would proceed as follows:

1. The user initiates a new interactive coding session. At this stage the state of the system is such that there are no code blocks or variables associated with the session.
2. The system attaches the code session to the workbook.
3. Upon attaching the workbook to the code session the system scans the workbook for existing named ranges and their associated values (if these have been specified).
4. Upon finding a named range, an associated variable with a matching name and the appropriate value(s) is created in the code session.

Those skilled in the art will appreciate that this restoration of the variable's states can be extended to the code itself and that the entire state of an interactive session can be stored in a spreadsheet workbook. Advantageously, the interactive coding environment comprises a user interface object that allows the user to save the entire session state to the linked spreadsheet workbook.

The various embodiments for storing the software code in the spreadsheet workbook will also be appreciated by those skilled in the art:

Storing the entire text of the code in a single worksheet cell.

Storing each line of the code in a separate cell.

Storing different types of code block (e.g. the code for a function) in different worksheet cells.

Storing the entire text of the code as an embedded structure within the workbook file (e.g. as a so-called XML-Part in the popular Microsoft Excel® application).

These examples are not intended as an exhaustive list of possible embodiments and those skilled in the art will appreciate that various combinations of the above storage mechanisms are equally valid.

If the code for the session is stored within the workbook then in principle the end state of the system could be restored simply by replaying the code. However this could be costly in computational terms and an option to restore state from the last known values could be valuable.

Metadata

Computer languages can be classified according to whether they are strongly or weakly-typed. In strongly-typed languages the interpreter or compiler enforces the type of value assigned to a declared variable. For example, if a particular variable is declared as an integer type, then the interpreter or compiler will raise an error if the user attempts to assign a string to it.

Advantageously, a system according to aspects of the present invention provides for the ability to associate metadata (i.e. data type information) with a named range. For example, when restoring an interactive session we will often require knowledge of the data types stored in the named ranges. Dependent on the data type, in commonly available spreadsheet applications this information can be difficult to acquire: For example, a date will normally be stored simply as a number.

In one embodiment the metadata could be stored separately within the body of the workbook file. For example, in Microsoft Excel®, we could define a metadata object, convert it to XML and store it as an XML-Part within the file. An alternative embodiment, however, is simply to use the formatting assigned to the cell by either the user (for pre-defined named ranges) or by the system when creating the named range from the declared variable.

When using a workbook with pre-defined named ranges, we can use this format-mediated metadata to enforce type safety for weakly-typed languages in the interactive code environment. Advantageously, this functionality can be implemented by enhancing the name-matching dispatcher to additionally match the variable type in the code to the assigned format of the matching named cell. For example, a user can enforce integer type-safety by assigning a number format to an existing named cell, using a format with no decimal places. If the user subsequently attempts to assign a real value (e.g. 2.5) to the matching variable in the code window, then the dispatcher will check that the types match before writing the value to the named cell, and alert the user if there is a conflict. Note that for a weakly-typed language the general cell format would be the default format used for auto-created named cells.

When using a strongly-typed language and a workbook that does not have pre-existing named ranges we can use this approach to ensure values are displayed correctly in the worksheet. For example, if the user defines an integer variable called "Input1" in the software code then the system will first create a matching named cell then assign a number format to the cell that has no decimal places.

Those skilled in the art will recognize that the dispatcher could also be enhanced to check the metadata stored in an XML-part within the workbook.

Caching of State for Compilers

In our discussion of the proposed interactive coding environment up to this point we have made no assumptions with regard to use of an interpreter or a compiler for managing the software code. As previously mentioned, the implementation of an interactive environment is possible using either approach, with an interpreter 724 illustrated in FIG. 7(*c*).

Figure 11:
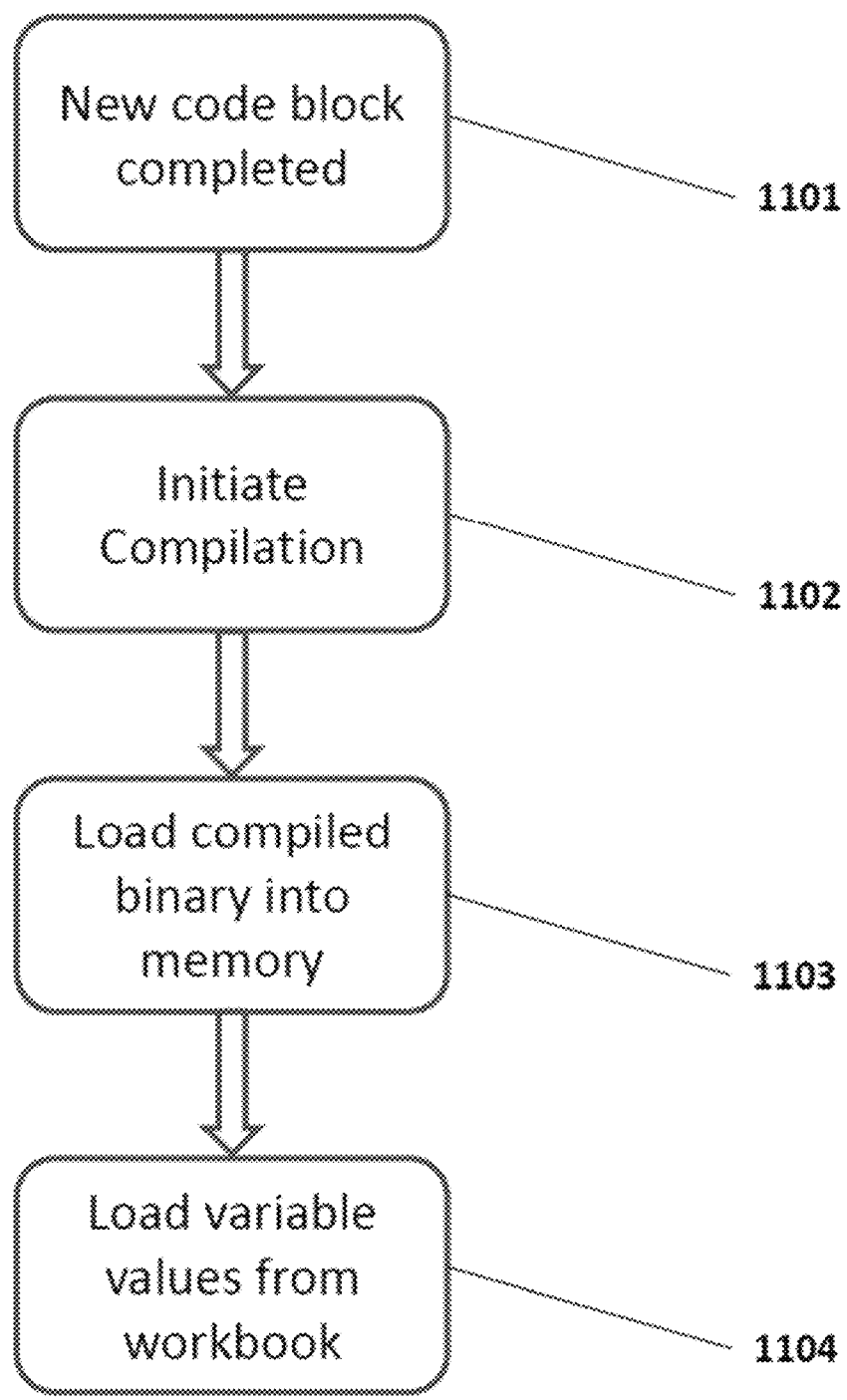
FIG. 11: Exemplary workflow for a compiler-based interactive environment.

Advantageously, our name-matching approach provides a means of simplifying the implementation of a compiler-based interactive environment as well by having the spreadsheet workbook operate as a cache for the values of the defined variables. The values stored are obviously those last defined or calculated by the user. The basic workflow for this embodiment is shown in FIG. 11, starting at the point where the user has initiated compilation. More particularly, at step 1101 a new code block is completed in the interactive coding environment and at step 1102 compilation of the code block is initiated. Once completed, the compiled code is then loaded into the spreadsheet workbook (or memory or cache) at step 1103, and then at step 1104 the variable values from the workbook can be loaded back to the code.

The key to this embodiment is the ability to automatically store the state of the variables and restore them after compilation without any requirement for user intervention. This approach therefore provides a novel means of implementing interactive environments for compiled software languages.

General Code Execution

Interactive code environments are generally characterized by the following:
The ability to handle relatively small code blocks.
The ability to incrementally build a larger code block from smaller code blocks as the user adds the additional smaller code blocks.

Those skilled in the art will appreciate that a system that has the above abilities will by extension have the core capability to handle a single self-contained unit of code, whether as an interpreted script or as compiled code. In a preferred embodiment the user would load a text file containing the code to be executed and would then manually trigger the execution of the code. Those skilled in the art will appreciate that the file load and code execution could be performed as a single user intervention, i.e. the code would be automatically executed after the user loads the file. The loading of the file could also be triggered by a separate code execution process, rather than by the manual intervention of a user. By extension, the entire process of loading and execution could be triggered by a separate code execution process.

Those skilled in the art will appreciate that a number of combinations are possible and that, as in the interactive coding environment, the name-matching process is initiated from the code execution engine.

And as in the interactive coding environment, there will be no differentiation between inputs and outputs within the code: the state of all variables within the code will be reflected in the matching spreadsheet named ranges.

Unit Testing

A further application of name-matching between software variables and spreadsheet named ranges is in the area of software unit testing. A unit testing framework is designed to simplify the creation and management of tests for small well-defined units of code. The implementation of a unit testing framework using name-matching with spreadsheet workbooks involves an extension of the general code execution architecture described above.

Unit testing is widely used in the development of software and involves the user writing small scope-restricted tests which are then evaluated as part of a single global execution of all code units in the test set. The unit testing system will normally provide one of two types of output:

A Graphical User Interface (GUI) with a list of tests and a visual indicator such as a green or red marker for pass/fail.
A console-style output with a line for each test and pass/fail indicated in the output text.

Figures 12A, 12B, 12C:
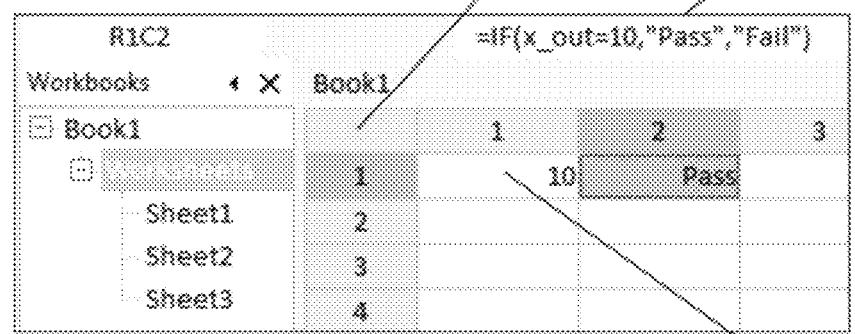
FIG. 12(a): An example of software code for a unit test framework.
FIG. 12(b): A further example of software code for a unit test framework comprising a spreadsheet for test validation.
FIG. 12(c): Screenshot of a section of a worksheet corresponding to the exemplary test code of FIG. 12(b).

A standard feature of unit test frameworks is that the test condition and test execution is performed within the test code. For example, a code block might be executed and a particular variable (say x_out) would be expected to have the value 10 for two input values (say y_in and z_in). Some typical code 1201 to illustrate such a simple test is shown in FIG. 12(*a*). It is clear that any changes to the test will require changes to both the input values and the test condition within the code.

By using name-matching we can implement a system wherein the values of all variables are written to matching named ranges and the check of the test condition is performed using standard spreadsheet functionality. In a preferred embodiment (for example, using the above test code) we build the following:

A worksheet with a named range called "x_out"
A separate cell containing the formula: =IF(x_out=10, "Pass", "Fail")

Our test code 1201 of FIG. 12(*a*) can now be reduced to the code 1202 illustrated in FIG. 12(*b*). For completeness, in FIG. 12(*c*) we also show a screenshot of a section of worksheet 1203 with the check formula 1204 entered adjacent to the output value 1205. This worksheet 1203 has a named cell "x_out" at R1C1 and we observe the output value 10 1205 which is the expected output value, as well as the use of the cell name in the check formula 1204.

Those skilled in the art will recognize that there are a number of ways in which the pass/fail state can be indicated to the user. For example, the cell at R1C2 could be colored red for a fail and green for a pass.

In the described embodiment of a unit-testing framework it is clear that the input values remain hard-coded within the body of the test. Given that the worksheet function architecture has the ability to implement name-matching for input values, a possible extension of the unit-test architecture might involve name-matching for test input values. However, we have already seen that in the general code execution architecture (upon which a unit-testing framework would be implemented) there is no means by which the dispatcher can differentiate between input and output variables within the body of the code, with related workarounds as described herein.

Earlier in these teachings we have described an embodiment of worksheet functions wherein one or more of the input named ranges are defined to have workbook-level scope. We have also described how the same worksheet function (implementing name-matching for outputs) can be used multiple times within a single workbook by restricting the scope of the output named ranges to be defined as worksheet-level. Note that we use the terms "workbook-level scope" and "workbook-scope" interchangeably and similarly for worksheet-scope.

In a preferred embodiment, we therefore configure the dispatcher in the unit-testing architecture to use named ranges at workbook-level scope as outputs, with all input named ranges defined with worksheet-level scope. The opposite assignation will of course also be a valid embodiment: that is, workbook-level scope for inputs and worksheet-level scope for outputs.

By combining named-range scope with suffixes or prefixes we can extend the functionality of the unit-testing framework still further. We additionally exploit the fact that although a particular named range might be defined with workbook-level scope, it will still be associated with a specific worksheet. In a preferred embodiment we use the worksheet name as a suffix or prefix for all workbook-scope named ranges hence allowing multiple tests of the same code to be executed within a single workbook.

Those skilled in the art will appreciate that a wide range of embodiments are possible by combining named range scope with suffixes and prefixes. More complicated tests can be easily constructed, with the values of intermediate variables also being tested. This provides a powerful tool for debugging test failures.

Various modifications and improvements can be made to the above without departing from the scope of the disclosure.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

The invention claimed is:

1. A computerized method of data processing comprising:
providing a spreadsheet engine for use by a computing device and including a spreadsheet workbook having one or more spreadsheet worksheets;
providing an execution engine for execution of computer software code for use by the computing device, the execution engine managing and executing the computer software code in the form of an application, script or linked library used by the computing device and providing at least an output dispatcher; and
retrieving names and values of variables defined in the computer software code, each variable having a respective variable name;
the output dispatcher comprising name-matching functionality that matches the variable names defined in the computer software code to one or more worksheet named ranges each having a respective worksheet range name;
wherein each of the named worksheet ranges are name-matched at runtime to the respective variable name defined within the computer software code, where a worksheet named range is a cell range that can be addressed by the spreadsheet engine via the worksheet range name assigned to the respective worksheet named range.

2. The method of claim 1, wherein the worksheet named ranges are pre-defined.

3. The method of claim 1, wherein the worksheet named ranges are defined at runtime, and wherein each worksheet range name is defined based on a matching variable name defined in the computer software code.

4. The method of claim 3, wherein the worksheet range name defined at runtime is identical to the respective variable name defined in the computer software code.

5. The method of claim 3, wherein the worksheet range name defined at runtime comprises a pre-defined suffix or prefix.

6. The method of claim 3, wherein the worksheet range name defined at runtime comprises a suffix or prefix which is generated automatically at runtime.

7. The method of claim 1, wherein a user can customize an output format of a spreadsheet worksheet by creating or deleting different output worksheet named ranges.

8. The method of claim 7, wherein different outputs can be presented to different users according to user permissions or roles.

9. The method of claim 8, wherein a user can specify different layouts for different output values.

10. The method of claim 7, wherein output values are located next to cells with descriptive labels.

11. The method of claim 1, wherein the computer software code comprises one or more variables, each variable defining a property name and a property type, and wherein the variable property names and types are determined by the computing device at runtime using runtime type information.

12. The method of claim 1, further comprising a software code interpreter able to evaluate individual lines of the computer software code in isolation.

13. The method of claim 1, further comprising a software code compiler able to evaluate individual lines of the computer software code in isolation.

14. The method of claim 1, wherein the execution engine provides a user interface enabling a user to enter and evaluate one or more lines of the computer software code.

15. The method of claim 14, wherein the creation of a named range within the spreadsheet workbook generates code defining a corresponding matching variable.

16. The method of claim 14, wherein the user interface further enables a user to load a file comprising the computer software code.

17. The method of claim 14, wherein the spreadsheet engine provides a spreadsheet worksheet function for retrieving values to be used as input values and processing the input values to derive one or more output values.

18. The method of claim 1, wherein type information expected for a worksheet named range is stored internally within the spreadsheet workbook.

19. The method of claim 1, wherein type information expected for a worksheet named range is defined through formatting information for the worksheet named range.

20. The method of claim 1, wherein input and output variables within the computer software code are additionally matched to worksheet named ranges according to a scope of the respective worksheet named range.

21. The method of claim 20, wherein the input variables within the computer software code are additionally matched to worksheet named ranges defined as having worksheet-scope, and further wherein the output variables within the computer software code are additionally matched to worksheet named ranges defined as having workbook-scope.

22. The method of claim 20, wherein the input variables within the computer software code are additionally matched to worksheet named ranges defined as having workbook-scope, and further wherein the output variables within the computer software code are additionally matched to worksheet named ranges defined as having worksheet-scope.

23. A data processing system comprising a spreadsheet engine stored in a computer-readable medium of a computing device having one or more processors, the spreadsheet engine including a spreadsheet workbook having one or more spreadsheet worksheets, the data processing system further comprising an execution engine stored in the computer-readable medium of the computing device for execution of computer software code for use by the computing device, the execution engine managing and executing the computer software code in the form of an application, script or linked library used by the computing device and providing at least an output dispatcher, and the data processing system further comprising a means for retrieving names and values of variables defined in the computer software code, each variable having a respective variable name; the output dispatcher comprising name-matching functionality that matches the variable names defined in the computer software code to one or more worksheet named ranges each having a respective worksheet range name; wherein each of the named worksheet ranges are name-matched at runtime to the respective variable name defined within the computer software code, where a worksheet named range is a cell range that can be addressed by the spreadsheet engine via the worksheet range name assigned to the respective worksheet named range.

24. A computer program product comprising a non-transitory computer-readable medium and instructions, that, when executed on a computing device, enable it to function as a data processing system comprising a spreadsheet engine stored in the computer-readable medium of the computing device having one or more processors, the spreadsheet engine including a spreadsheet workbook having one or more spreadsheet worksheets, the data processing system further comprising an execution engine stored in the computer-readable medium of the computing device for execution of computer software code for use by the computing device, the execution engine managing and executing the computer software code in the form of an application, script or linked library used by the computing device and providing at least an output dispatcher, and the data processing system further comprising a means for retrieving names and values of variables defined in the computer software code, each variable having a respective variable name; the output dispatcher comprising name-matching functionality that matches the variable names defined in the computer software code to one or more worksheet named ranges each having a respective worksheet range name; wherein each of the named worksheet ranges are name-matched at runtime to the respective variable name defined within the computer software code, where a worksheet named range is a cell range that can be addressed by the spreadsheet engine via the worksheet range name assigned to the respective worksheet named range.

\* \* \* \* \*